United States Patent
Murayama et al.

(10) Patent No.: US 8,495,294 B2
(45) Date of Patent: Jul. 23, 2013

(54) MANAGEMENT COMPUTER FOR MANAGING STORAGE SYSTEM CAPACITY AND STORAGE SYSTEM CAPACITY MANAGEMENT METHOD

(75) Inventors: Koichi Murayama, Kawasaki (JP); Masayasu Asano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 622 days.

(21) Appl. No.: 12/604,106

(22) Filed: Oct. 22, 2009

(65) Prior Publication Data
US 2011/0040935 A1 Feb. 17, 2011

(30) Foreign Application Priority Data

Aug. 12, 2009 (JP) .................................. 2009-186959

(51) Int. Cl.
*G06F 12/00* (2006.01)
*G06F 12/16* (2006.01)

(52) U.S. Cl.
USPC ........... 711/114; 711/170; 711/162; 711/165; 711/154; 711/173; 711/E12.001; 711/E12.002; 710/2

(58) Field of Classification Search
USPC .......... 711/114, 170, 162, E12.001, E12.002, 711/165, 154, 173; 710/2
See application file for complete search history.

(56) References Cited

U.S. PATENT DOCUMENTS

| 5,964,848 | A | * | 10/1999 | Kikinis et al. ..................... 710/2 |
| 6,842,876 | B2 | * | 1/2005 | Schilit et al. ................... 715/256 |
| 7,251,664 | B2 | * | 7/2007 | Fukuda et al. ................. 707/812 |
| 8,108,630 | B2 | * | 1/2012 | Nagata et al. .................. 711/154 |
| 2005/0055370 | A1 | * | 3/2005 | Fukuda et al. ............ 707/103 X |
| 2006/0047909 | A1 | | 3/2006 | Takahashi et al. |
| 2006/0218367 | A1 | * | 9/2006 | Ukai et al. ..................... 711/165 |
| 2007/0055713 | A1 | | 3/2007 | Nagai et al. |
| 2007/0239954 | A1 | * | 10/2007 | Sakashita et al. ............. 711/165 |

FOREIGN PATENT DOCUMENTS

| JP | 2006-099748 A | 4/2006 |
| JP | 2007-066259 A | 3/2007 |

* cited by examiner

*Primary Examiner* — Mardochee Chery
(74) *Attorney, Agent, or Firm* — Foley & Lardner LLP

(57) ABSTRACT

A management system, which manages a plurality of storage systems, in a case where belonging to a storage system having a first function constitutes a condition for allocating a plurality of volumes to a host device, retrieves the storage system having the first function from among the plurality of storage systems, selects one or more unallocated logical volumes included in the retrieved storage system, acquires a logical volume capacity included in the selected logical volumes and notifies an output device of the acquired capacity as the capacity allocatable to the host device.

15 Claims, 24 Drawing Sheets

| STORAGE ID (211) | VOLUME ID (212) | VOLUME TYPE (213) | RAID GROUP (214) | CAPACITY (215) | ALLOCATION DESTINATION (216) | P/S TYPE (217) |
|---|---|---|---|---|---|---|
| Storage1 | 00:01 | FC:RAID5 | RG1 | 80GB | Host1 | — |
| Storage1 | 00:02 | FC:RAID5 | RG1 | 80GB | Host1 | — |
| Storage1 | 00:03 | FC:RAID5 | RG1 | 80GB | n/a | — |
| Storage1 | 00:04 | FC:RAID5 | RG2 | 80GB | Host1 | — |
| Storage1 | 00:05 | FC:RAID5 | RG2 | 50GB | n/a | — |
| Storage1 | 00:06 | FC:RAID1 | RG3 | 50GB | Host5 | Primary (Storage1: 00:09) |
| Storage1 | 00:07 | FC:RAID1 | RG3 | 50GB | Host5 | — |
| Storage1 | 00:08 | SATA:RAID5 | RG4 | 50GB | n/a | — |
| Storage1 | 00:09 | SATA:RAID5 | RG4 | 50GB | Host5 | Secondary (Storage1: 00:06) |
| ... | ... | ... | ... | ... | ... | ... |
| Storage2 | 00:01 | FC:RAID5 | RG1 | 40GB | n/a | — |
| ... | ... | ... | ... | ... | ... | ... |

FIG. 8

| HOST ID | IP ADDRESS | VOLUME ID | MOUNT POINT | ALLOCATION POLICY |
|---|---|---|---|---|
| Host1 | 192.168.5.2 | Storage1:00:01, Storage1:00:02, Storage1:00:04, | C:, D:, n/a : | Policy1, Policy1, Policy1 |
| Host2 | 192.168.5.3 | Storage1:01:01, Storage1:01:02 | C:, n/a | Policy1 Policy1 |
| Host3 | 192.168.5.4 | Storage1:02:01, Storage1:02:02 | C:, D: | Policy2 Policy3 |
| ... | ... | ... | ... | ... |

FIG. 10

| | 241 | 242 | 243 | 244 | 24 245 | 246 |
|---|---|---|---|---|---|---|
| POLICY ID | STORAGE CONDITION | VOLUME CONDITION | STORAGE FUNCTION CONDITION | APPLICATION DESTINATION | THRESHOLD VALUE |
| Policy1 | Storage1 | FC:RAID5 | * | Host1, Host2 | 500GB |
| Policy2 | S1 | FC:RAID5 | LOCAL COPY | Host3, Host4 | 500GB |
| Policy3 | S1 | FC:RAID5 | REMOTE COPY | Host3, Host4 | 500GB |
| Policy4 | S1 | FC:RAID1 | LOCAL COPY, AES ENCRYPTION | Host5, Host6 | 500GB |
| Policy5 | S1,S2 | FC:RAID5, FC:RAID1 | LOCAL COPY | Host7, Host8 | 500GB |
| Policy6 | — | — | LOCAL COPY | Host9, Host10 | 500GB |

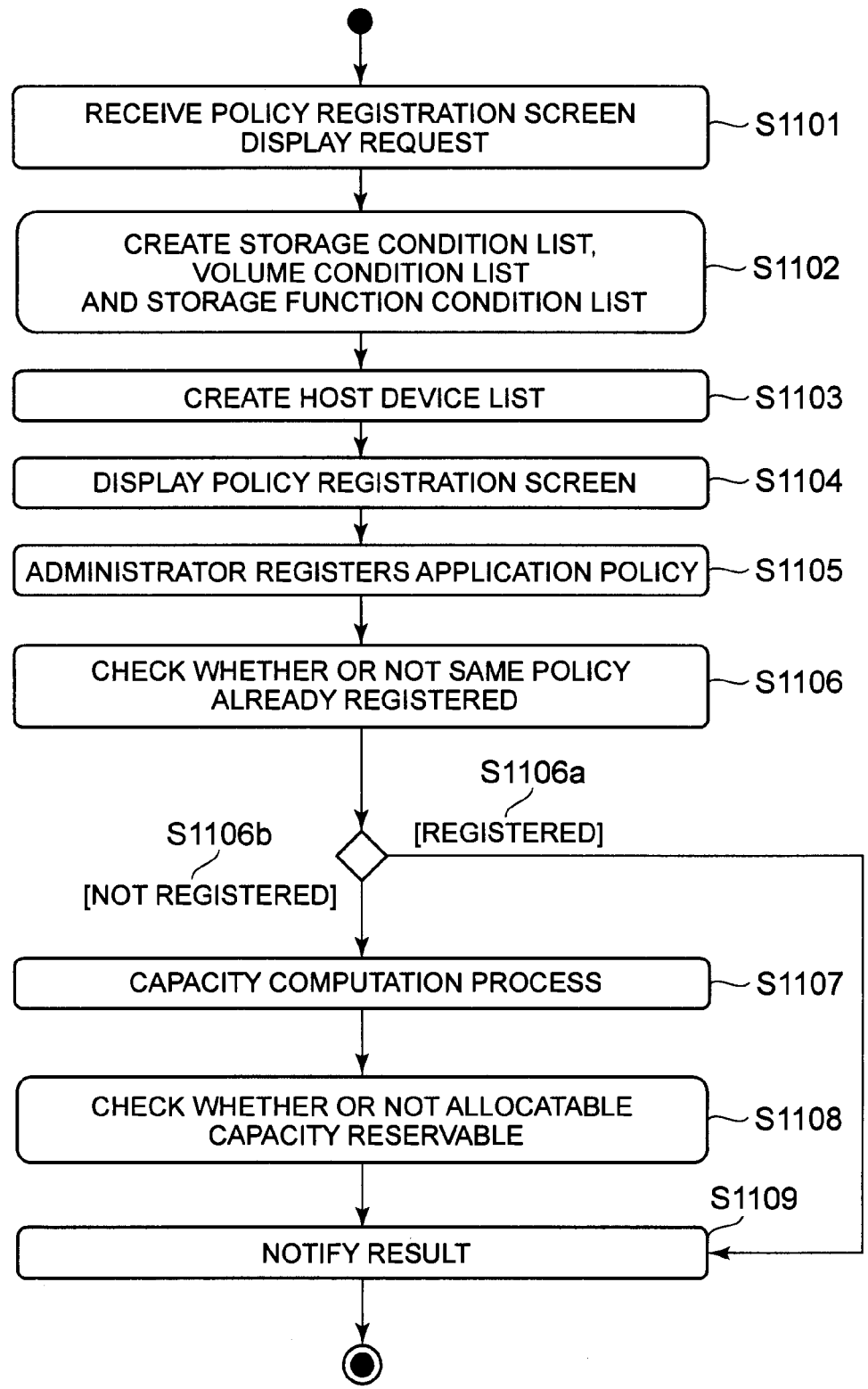

MANAGEMENT COMPUTER FOR MANAGING STORAGE SYSTEM CAPACITY AND STORAGE SYSTEM CAPACITY MANAGEMENT METHOD

CROSS-REFERENCE TO PRIOR APPLICATION

This application relates to and claims the benefit of priority from Japanese Patent Application number 2009-186959, filed on Aug. 12, 2009 the entire disclosure of which is incorporated herein by reference.

BACKGROUND

The present invention generally relates to a computer system configured from a storage system, a host device and a management computer, and more particularly, to the management of storage capacity in a storage system by a management computer.

Japanese Patent Application Laid-open No. 2003-037602 discloses a storage device which comprises a disk volume for storing data, and which is provided with a volume creation function. The volume creation function references a volume ID, a capacity and a characteristic to be met by a logical volume inputted via a logical volume creation screen by an administrator, and allocates to a host computer a logical volume that satisfies the inputted capacity and characteristic.

As one method for efficiently managing the SAN environment which is becoming larger in scale and more complex, Japanese Patent Application Laid-open No. 2004-250327 discloses a hierarchical management method, which makes it possible for the user to allocate an appropriate volume so as to satisfy a host device-required condition by defining a volume hierarchy in accordance with volume attributes (high performance/high cost, low performance/low cost) and implementing a migration in accordance with a data life cycle.

According to this technology, it is possible to operate a storage system on the basis of a predetermined policy without the user having to directly manage individual volume attributes at volume provisioning and migration.

SUMMARY

When a user (an administrator) allocates a storage area of the storage system to a host device, a volume must be allocated while taking into account not only the attributes of the volume (for example, the type of Hard Disk Drive (hereinafter, HDD) or the level of the Redundant Arrays of Inexpensive Disks (hereinafter, RAID)), but also the copy pair configuration (first generation local copy and so forth) and the use of encryption.

Even in a case where an unused volume that satisfies the characteristic of the volume required by the host device exists, this volume may not be able to provide the storage capacity to satisfy the copy pair configuration requirements or encryption requirements required by the host device. Therefore, the problem is that, as in Japanese Patent Application Laid-open No. 2003-037602, even though the user performs management related to the characteristics and performance of the volume used to create the volume, such as the type of HDD, i.e., HDD that have an FC interface or HDD that have a SATA interface, the user is not able to allocate to the host device a volume with the proper storage capacity to satisfy other requirements, such as the copy pair configuration requirement.

For example, in the case of a requirement other than the volume characteristics and performance required by the host device, such as a copy configuration requirement that calls for the "creation of three generations of backup in accordance with a local copy", the storage capacity of the allocated volume must be three times the capacity for storing the data sent from the host device. However, in a case where the allocated volume storage capacity is determined solely on whether or not the volume characteristics required by the host device are satisfied, even when a volume, which satisfies the characteristics and performance requirements, possesses the capacity for storing the data sent from the host device, this volume may not have enough storage capacity to satisfy the other requirements. Further, in the case of a requirement other than the volume characteristics and performance required by the host device, such as an encryption requirement that calls for "encryption in accordance with a certain encryption function", even though a volume that satisfies the characteristics and performance requirements demanded by the host device exists in the storage system, this volume may not be able to provide the encryption function that the storage system to which it belongs requires.

There is also the problem that as computer systems become larger and more complex in line with the increased number of storage systems and volumes provided by these storage systems, which are targeted for management by the management device, the management costs of the user (systems administrator) rise.

A management device for solving the above-mentioned problems is one, which includes a plurality of storage devices forming a plurality of logical volumes, and which manages a plurality of storage systems connected to a host device, the management device comprising: a memory for storing allocation policy management information, function management information denoting a function provided to each of the plurality of storage systems, and logical volume management information denoting a capacity of each of the plurality of logical volumes; and a processor for executing a process based on the information stored in the memory, wherein the processor receives an allocation policy, the processor, based on the received allocation policy and the allocation policy management information stored in the memory, acquires information showing that a logical volume belonging to a storage system having a first function constitutes a condition for allocating a logical volume to the host device, and the processor, based on the function management information stored in the memory, retrieves the storage system having the first function from among the plurality of storage systems, selects an unallocated logical volume included in the retrieved storage system, and based on the logical volume management information stored in the memory, acquires the logical volume capacity included in the selected logical volume and notifies an output device of the acquired capacity as a capacity allocatable to the host device.

This makes it possible to manage the utilization status of the storage area based on the storage system-provided function, thereby facilitating capacity management from the standpoint of the user who is using the host device.

BRIEF DESCRIPTION OF THE DRAWINGS

FIG. 7 is a diagram showing an example of volume management information 21 in this embodiment;

FIG. 8 is a diagram showing an example of host management information 22 in this embodiment;

FIG. 10 is a diagram showing an example of allocation policy management information 24 in this embodiment;

FIG. 11 is a diagram showing a flowchart of a process in this embodiment for registering a volume allocation policy;

DETAILED DESCRIPTION OF THE EMBODIMENT

Figure 1:
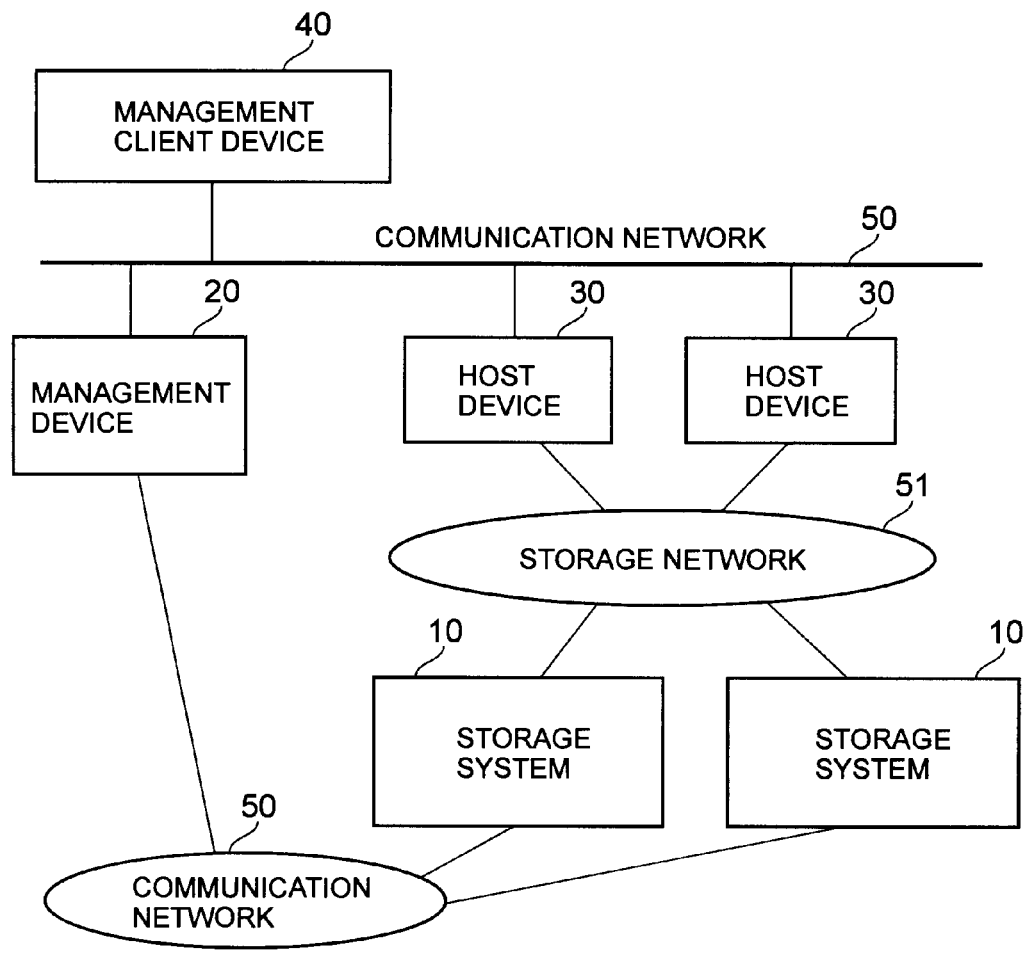
FIG. 1 is a diagram showing an example of an outline drawing showing the configuration of a computer system 1 in this embodiment.

The embodiment will be explained below while referring to the drawings.

<System Configuration>

FIG. 1 shows an example of an outline drawing showing the configuration of a computer system 1 in this embodiment. The computer system 1 comprises a storage system 10, a management device 20, a host device 30, and a management client device 40. These devices are all communicably interconnected via a communication network 50, such as a LAN (Local Area Network). Further, the host device 30 and storage system 10, for example, are communicably connected to a storage system 10 via a storage network 51, such as a SAN (Storage Area Network). Communications in the storage network 51, for example, is carried out in accordance with a communication protocol, such as Fibre Channel, iSCSI (Internet Small Computer System Interface) or the like.

The computer system of FIG. 1 is configured from two storage systems 10, one management device 20, two host devices 30, and one management client device 40, but the number of devices is not limited to this configuration.

Figure 2:
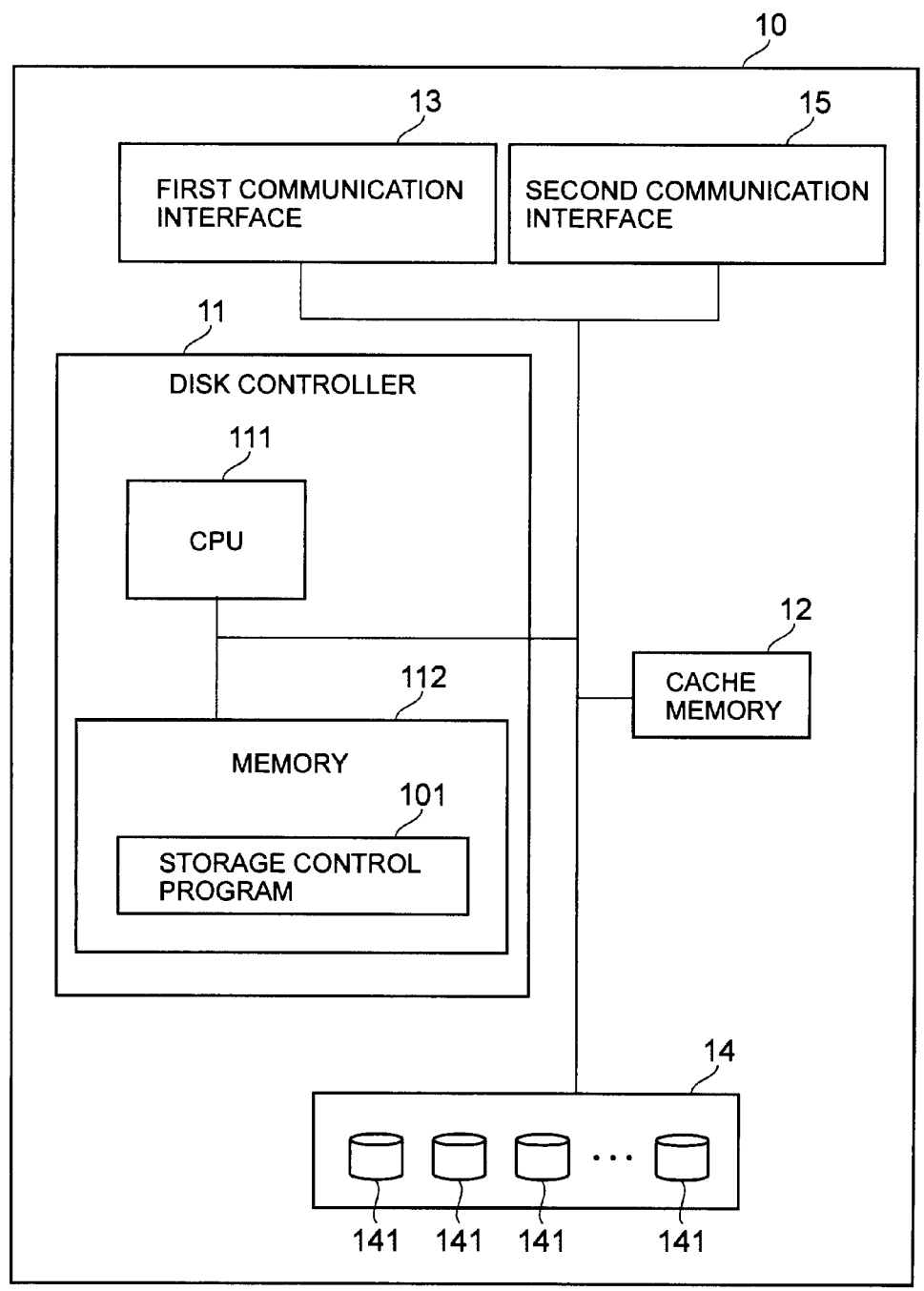
FIG. 2 is a diagram showing an example of a storage system 10 in this embodiment.

FIG. 2 is a diagram showing an example of the storage system 10 in this embodiment. The storage system 10 comprises a disk controller 11, a cache memory 12, a first communication interface 13 connected to the storage network 51, a storage apparatus 14, and a second communication interface 15 connected to the communication network 50.

The disk controller 11 comprises a CPU 111 and a memory 112. The disk controller 11 executes processing for realizing the functions of the storage system 10. For example, the disk controller 11 executes a read process or a write process in accordance with a read request or a write request sent from the host device 30, which will be explained below.

Write data, which is sent from the host device 30 and written to the storage apparatus 14, for example, is temporarily stored in the cache memory 12. Further, read data, which is read out from the storage apparatus 14 in accordance with a read request from the host device 30 is temporarily stored in the cache memory 12.

The storage apparatus 14 comprises one or more HDD (Hard Disk Drives) 141. Furthermore, the storage device included in the storage apparatus 14 is not limited to a HDD, and may also be another storage device, such as a semiconductor storage device (SSD (Solid State Drive)) or the like. The storage apparatus 14 may be controlled by a RAID (Redundant Arrays of Inexpensive (or Independent) Disks) system (RAID 0 through RAID 6). The storage capacity, attributes such as type of interface, i.e. SATA (Serial AT Attachment), FC (Fibre Channel), SAS (Serial Attached SCSI) and so forth, and performance aspects, such as rotational speed, transfer rate, average seek time, and average rotational delay time of the respective HDD 141 are maintained for each HDD.

In addition, the storage system 10 may be configured by a plurality of hardware with different enclosures. In accordance with this, different hardware equipment and different hardware vendors may be intermixed. For example, this storage system 10 comprises a first interface controller (a channel controller) for communicating with the host device 30, a disk controller for accessing the hard disk drive, a cache memory, which is used to exchange data between the channel controller and the disk controller, and communication equipment, such as a switch for communicably interconnecting the respective parts of the system.

The CPU 111 provided in the disk controller 11 of the storage system 10, for example, reads out a storage control program 101 from the storage apparatus to the memory 112. Then, the storage control program 101 is executed by the CPU. There may be instances below when the execution of a process will be explained by making the program the subject, but the CPU, which is a processor for executing programs, actually carries out the processing by executing the relevant program. When the CPU 111 executes the storage control program 101, there may be cases that involve functions provided by other software programs, such as the operating system and device driver that operate in the storage system 10.

The storage control program 101, in accordance with a request from the management device 20, executes the creation and deletion of a logical volume, the allocation of a logical volume to the host device 30, the replication (local copy) of a logical volume inside the storage system 10, and the replication (remote copy) of a logical volume between a plurality of storage systems 10. The storage control program 101 also manages a variety of threshold values to be described below, which are set by the management device 20, the host device 30, the management client device 40 or the user.

Figure 3:
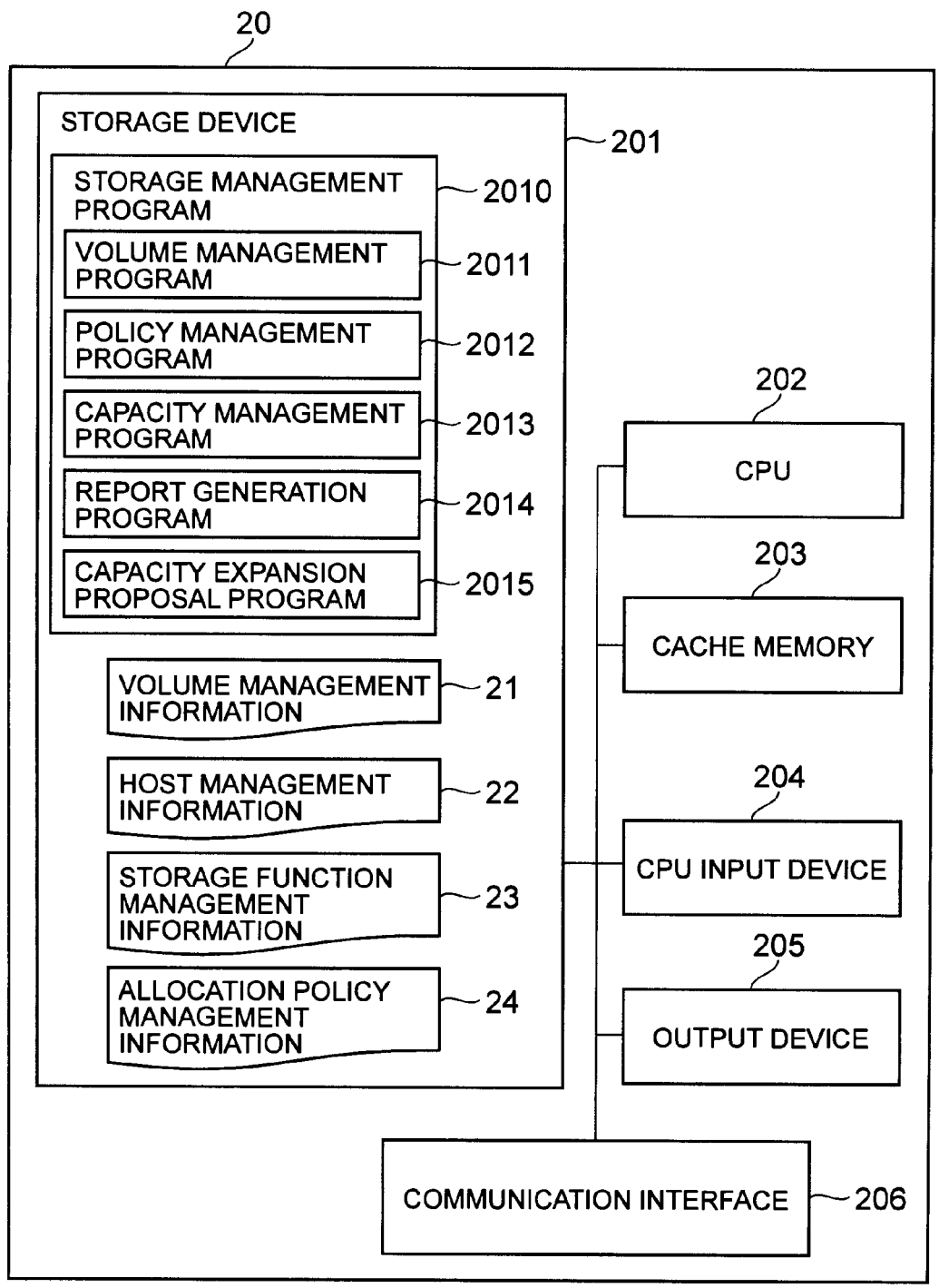
FIG. 3 is a diagram showing an example of a management device 20 in this embodiment.

FIG. 3 is a diagram showing an example of the management device 20 in this embodiment. In this embodiment, the management device 20 is separate hardware from the storage system 10. However, the present invention is not limited to this configuration, and the management device 20 and storage system 10 may be an integral hardware configuration.

The management device 20 comprises a storage device 201, such as a memory, a CPU 202, a cache memory 203, an input device 204, an output device 205, and a communication interface 206. The input device 204 is for a user (administrator) to input data, and, for example, is a keyboard or a mouse. The output device 205 is a screen, for example, for displaying management information and the like to the user, and, for example, is a display device such as a CRT. The CPU 202 is a processor for executing a program stored in the storage device 201. The storage device 201 stores a storage management program 2010, comprising a volume management program 2011, a policy management program 2012, a capacity computation program 2013, a report generation program 2014, and a capacity expansion proposal program 2015. The storage device 201 also stores volume management information 21, host management information 22, storage function management information 23, and allocation policy management information 24.

The respective programs shown in FIG. 3 are read out from the storage device 201 and executed by the CPU 202 of the management device 20. Although there may be instances below when the execution of a process will be explained by making the program the subject, the CPU 202, which is a processor for executing programs, actually carries out the processing by executing the relevant program. Implementing a program may also involve functions realized in accordance with other software programs, such as the operating system and device driver that operate in the management device 20.

In FIG. 3, the storage management program 2010 of the management device 20, in accordance with a request from the management client device 40, manages the storage system 10 via the storage control program 101 of the storage system 10.

Overviews of the functions provided by the respective programs included in the storage management program 2010 will be shown below. These functions will be explained in detail below using the flowcharts.

The volume management program 2011 executes a volume management process of the storage system 10, such as an instruction to the storage system 10 to create or delete a logical volume, an instruction to the storage system 10 to allocate a volume to the host device 30, an instruction to the storage system 10 to construct a copy-pair configuration, and an instruction to the storage system 10 to migrate data stored in a volume. The volume management program 2011 also manages the volume management information 21, which will be described below.

The policy management program 2012 provides a function for registering a volume allocation policy, and manages the allocation policy management information 24, which will be described below.

The capacity computation program 2013 provides a function for computing the remaining capacity in an allocatable volume in the management device 20-managed storage system 10 so as to satisfy the volume allocation policy specified by the administrator. In this embodiment, this remaining capacity is expressed as either the "volume allocatable capacity" or simply the "allocatable capacity". When the process for computing the allocatable capacity has ended, the capacity computation program 2013 returns the computed allocatable capacity, and at the same time also returns a list of volumes that will ultimately be capable of being allocated so as to satisfy this allocation policy.

The report generation program 2014 provides a function for reporting the allocatable capacity of usable volumes for each volume allocation policy that is registered.

The capacity expansion proposal program 2015 provides a function for proposing a method for expanding capacity with respect to the specified volume allocation policy.

The respective information will be explained below using the drawings.

Figure 4:
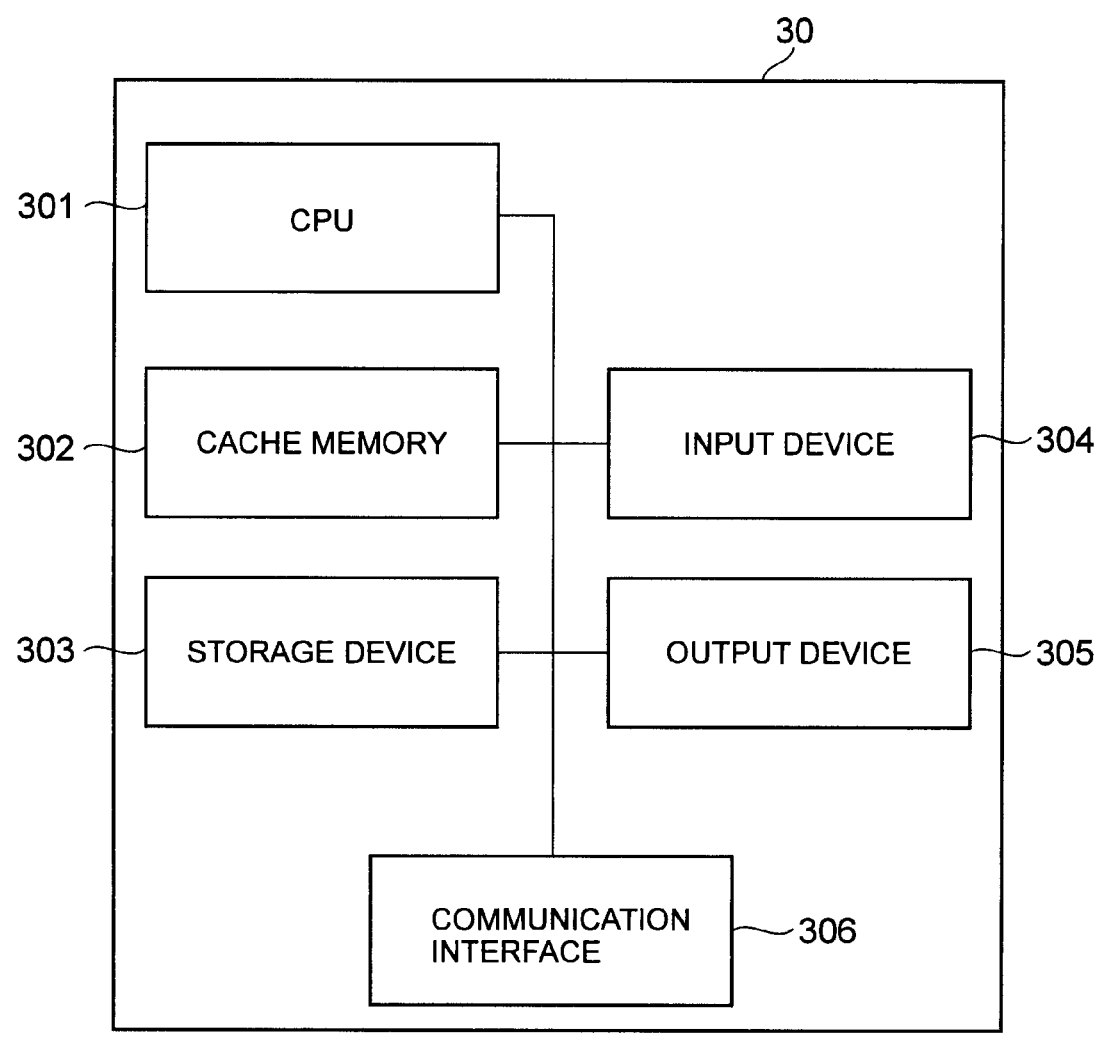
FIG. 4 is a diagram showing an example of a host device 30 in this embodiment.

FIG. 4 is a diagram showing an example of the host device 30 in this embodiment.

The host device 30, for example, is able to recognize a volume, which is a logical storage device of the storage system 10, and uses a logical volume provided by the storage system 10 as a storage device for storing data. The host device 30 also provides a service by executing an application program, such as a Database Management System (DBMS) or backup program. Then, the host device 30 issues to the storage system 10 a request to write data, which these functions use, to the volume, or a request to read data from the volume.

The host device 30 comprises a CPU 301, a cache memory 302, a storage device 303, an input device 304, an output device 305, and a communication interface 306.

The CPU 301 is a processor for executing a program stored in the storage device 303. The storage device 303, for example, stores an application program and an operating system program. The communication interface 306 is either a NIC (Network Interface Card) or a HBA (Host Bus Adapter), and connects to the storage system 10 via the storage network 51. The cache memory 302 is either a volatile or nonvolatile storage device (for example RAM (Random Access Memory) or ROM (Read Only Memory)), and, for example, is a storage area for temporarily holding data that is utilized by the application program. The input device 304, which accepts a user input, for example, is a keyboard or a mouse. The output device 305, which displays management information and other such information to the user, for example, is a liquid crystal monitor.

Figure 5:
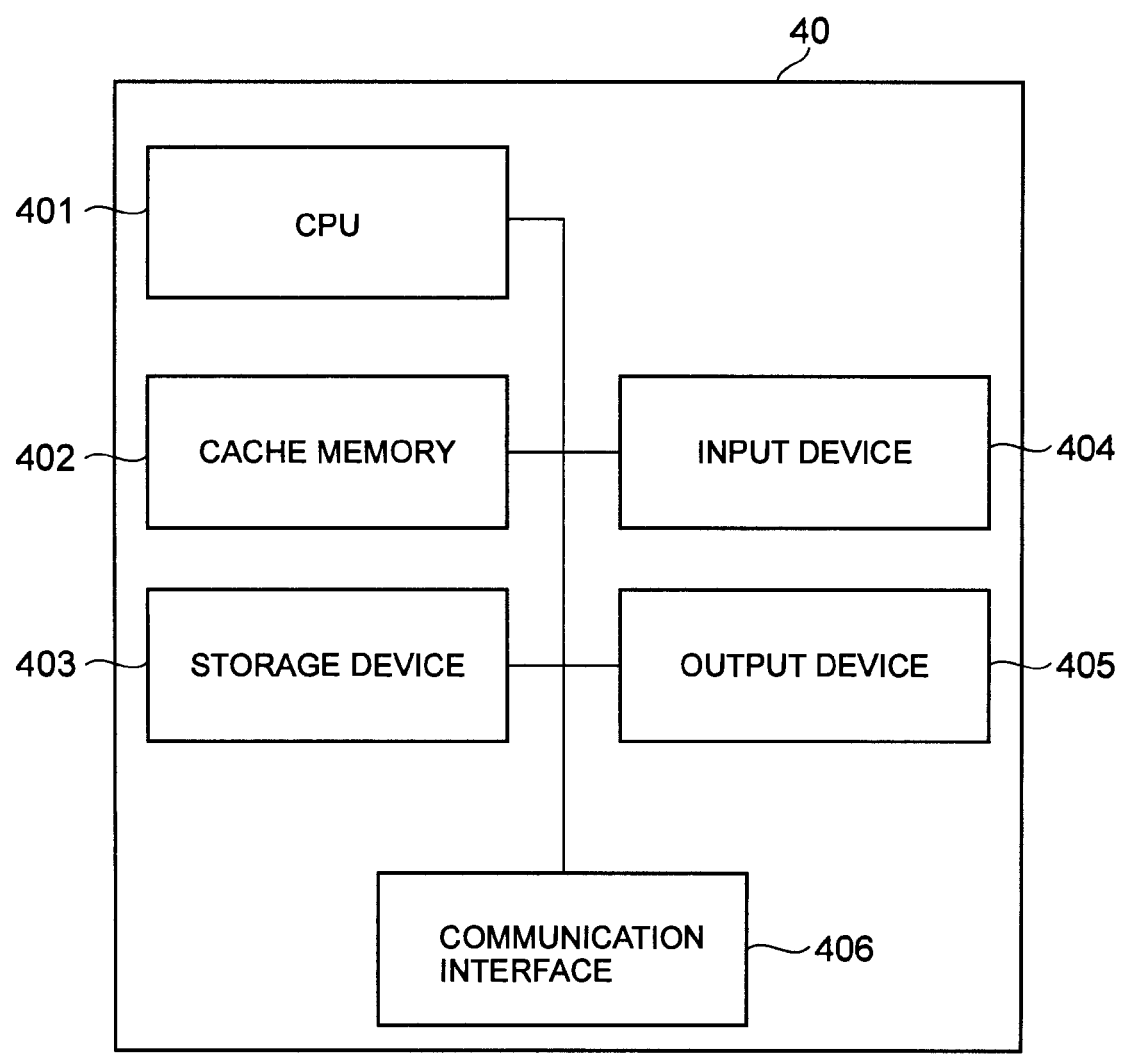
FIG. 5 is a diagram showing an example of a management client device 40 in this embodiment.

FIG. 5 is a diagram showing an example of the management client device 40 in this embodiment.

The management client device 40 comprises a GUI (Graphical User Interface) or CLI (Command Line Interface) for presenting the administrator with the execution result of the storage management program 2010 of the management device 20. The management client device 40 requests a management device 20 process based on an instruction inputted from the administrator. Furthermore, in this embodiment, the management client device 40 is separate hardware from the management device 20, but the present invention is not limited to this configuration, and the management client device 40 and management device 20 may be an integral hardware configuration.

The management client device 40 comprises a CPU 401, a cache memory 402, a storage device 403, an input device 404, an output device 405, and a communication interface 406.

The CPU 401 is a processor for executing a program stored in the storage device 403. The communication interface 406 connects to the management device 20 via the communication network. The cache memory 402 is either a volatile or nonvolatile storage device (for example RAM (Random Access Memory) or ROM (Read Only Memory)), and, for example, is a storage area for temporarily storing data that is used by the CPU. The input device 404, which accepts a user input, for example, is a keyboard or a mouse. The output device 405, which displays management information and other such information to the user, for example, is a liquid crystal monitor.

Figure 6:
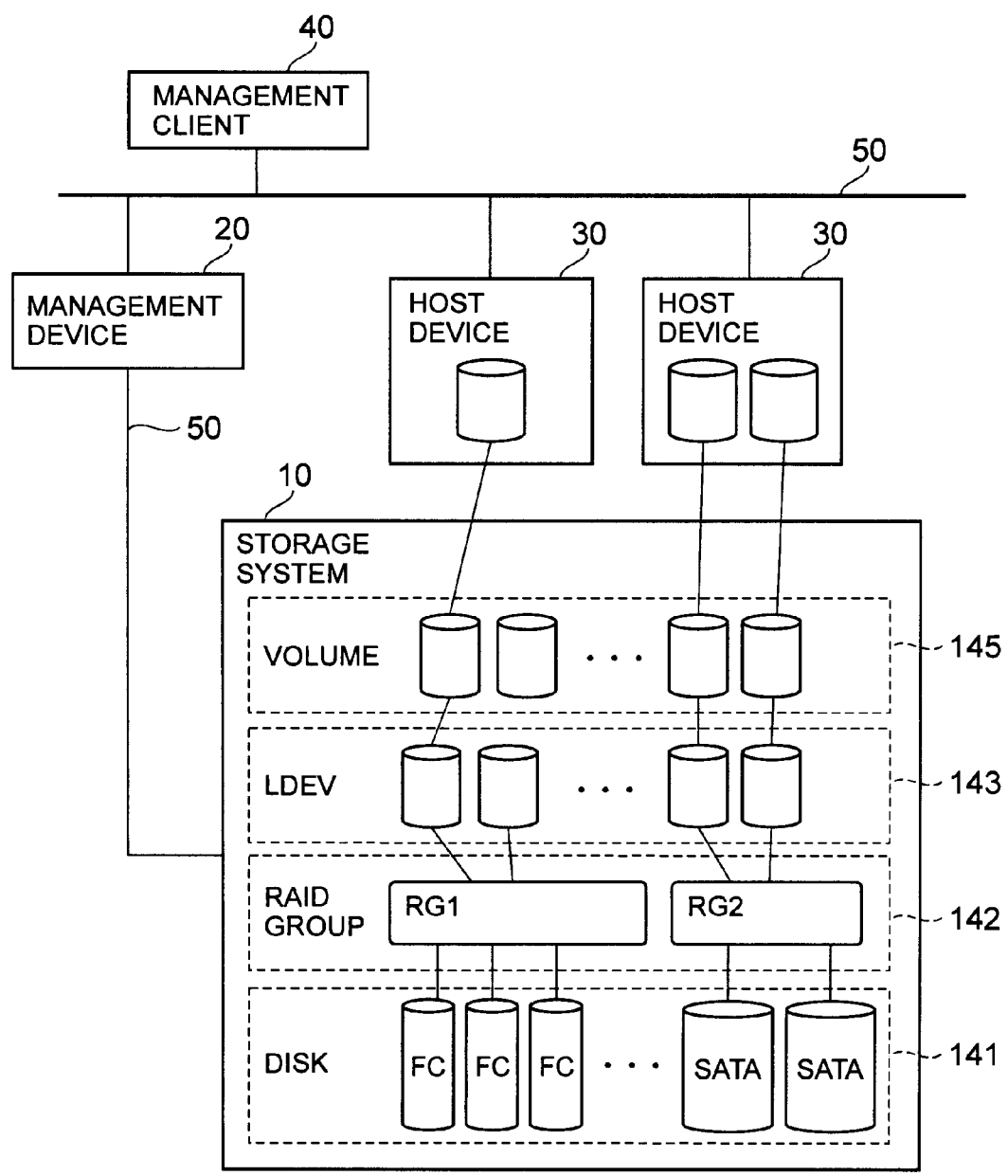
FIG. 6 is a diagram showing an example of a mode for providing a storage system storage area to a host device in this embodiment.

FIG. 6 is a diagram showing an example of a mode for providing a storage system storage area to a host device in this embodiment.

A RAID group 142 is configured in accordance with HDD and other such storage devices 141 included in the storage apparatus 14 of the storage system 10. Then, an LDEV (Logical DEVice) 143, which is a logical storage area (storage resource) configured using the storage area of the storage devices that form the RAID group, is provided. Each LDEV 143 comprises an attribute, which is information related to a specification, such as the RAID level, the type and model number of the interface of the HDD 141 that configure the LDEV 143, and the configuration, performance and reliability of each LDEV 143.

The storage system 10 configures a logical volume 145, which is a logical storage area configured using the storage area of one or more LDEV 143, and provides this logical volume to the host device 30. In this embodiment, there may be instances when a logical volume is simply called a volume. The host device is able to recognize this logical volume.

When there is a write request or a read request for data from the host 30 to the logical volume 145, the storage system identifies the LDEV configuring this logical volume 145, and the HDD configuring this LDEV, and executes a data write to this HDD or a data read from this HDD. In a case where the storage system 10 is configured from a plurality of hardware comprising different equipment and vendors, data migration and replication becomes possible between heterogeneous equipment and multiple vendors.

FIG. 7 is a diagram showing an example of the volume management information 21 in this embodiment. Furthermore, the format of the volume management information disclosed in FIG. 7 is an example, and the present invention is not limited to the format shown in the drawing.

Volume 145 information provided by the management device 20-managed storage system 10 is registered in the volume management information 21. The volume management information 21 has a plurality of records comprising the items storage ID 211, volume ID 212, volume type 213, RAID group 214, capacity 215, allocation destination 216, and P/S (Primary/Secondary) type 217.

Information, for example, an identifier for identifying the storage system 10 providing the logical volume 145 is stored under storage ID 211. As the storage ID, for example, a combination of the administrator-registered identification name, the model number and model name of the storage system 10, and the IP address furnished to the storage system 10 may be used.

Information, for example, an identifier for identifying the logical volume 145 is stored under volume ID 212.

Information related to attributes or performance, such as the disk type and RAID level of the storage device 141 forming the logical volume 145 is stored under volume type 213. A value, which links the disk type and RAID level of the physical disk with a colon (:), is stored here. For example, in the case of a logical volume configured from an FC disk and a RAID group of RAID level 5, "FC:RAID5" is stored as the volume type. FIG. 7 shows a case in which the storage device of the storage apparatus is a HDD 141. In a case where the storage device 141 is a semiconductor storage device (SSD), a value such as "SSD:RAID5" will be set as the volume type.

Further, in FIG. 7, the volume type 213 is configured from the disk type and the RAID level, but, for example, items related to the attributes and performance of the storage device, such as the rotating speed of the hard disk drive 141 and the reliability of the hard disk drive 141 may also be stored under volume type 213.

Information showing the RAID group 142 (the RAID group 142 which is configured in accordance with the storage devices 141 that form the logical volume 145) of the LDEV 143, which is the basis of the logical volume 145, is stored under RAID group 214.

Information showing the capacity of the logical volume 145 is stored under capacity 215.

Information showing the allocation destination of the logical volume 145 is stored under allocation destination 216. In a case where the logical volume 145 is allocated to the host device 30, a host ID, which will be explained below, is set. Furthermore, the allocation destination may be a physical target other than the host device, such as a NAS head, or may be a logical target like a volume pool, which is used for storing snapshot difference data. In a case where the logical volume 145 has not been allocated to any host device, n/a (non-allocated) is stored.

Information showing whether the logical volume 145 is a PVOL (Primary Volume) or a SVOL (Secondary Volume) is stored under P/S type 217. "Primary (Storage1:00:09)", which is the information stored in the Storage1:00:06 row of the P/S type 217, is information showing that the logical volume 145 is a PVOL, which has Storage1:00:09 as the corresponding SVOL. Further, the "Secondary (Storage1:00:06)", which is the information stored in the Storage1:00:09 row of the P/S type 217, is information showing that the logical volume 145 is a SVOL, which has Storage1:00:06 as the corresponding PVOL. The "-" stored in the other rows is information showing that the logical volume 145 is neither a PVOL nor a SVOL.

The volume management program 2011, in a case where a RAID group 142 is configured in accordance with the storage devices 141 of the storage apparatus 14 and a LDEV 143 is created, registers a record corresponding to this LDEV 143 in the volume management information 21. Further, when the LDEV 143 is deleted, the record corresponding to the deleted LDEV is deleted from the volume management information 21.

In this embodiment, the LDEV is configured from the HDD and RAID group on the same storage apparatus, but a virtual LDEV, which is configured from a storage area provided by another storage apparatus, is also possible. In this case, a value, which adds the identifier of the storage apparatus that is providing the storage area, is set in the volume type and RAID group. For example, in the case of a virtual LDEV configured from the storage area on RAID group RG1 of the FC:RAID 5 of Storage 2, the values Storage2:FC:RAID5, Storage2:RG1 are stored.

In a case where one LDEV is configured from a plurality of RAID groups, values that are linked by hyphens are respectively set in the volume type and the RAID group as attributes. In the case of a LDEV that is configured from the RG1 of FC:RAID5 and the RG2 of SATA:RAID1, the value FC:RAID5-SATA:RAID1 is stored as the volume type and the value RG1-RG2 is stored as the RAID group.

These volume types and RAID groups of the virtual LDEV are processed the same as the volume type and RAID group of a normal LDEV.

FIG. 8 is a diagram showing an example of the host management information 22 in this embodiment. The format of the host management information disclosed in FIG. 8 is an example, and the present invention is not limited to the format shown in the drawing.

Information about the logical volume 145 used by the host device 30 is registered in the host management information 22. The host management information 22 comprises a plurality of records comprising the items host ID 221, IP address 222, volume ID 223, mount point 224, and allocation policy 225.

Information for identifying the host device 30 is stored under host ID 221. For example, the host device 30 identifier is stored.

The IP address allocated to the host device is stored under IP address 222. The IP address, for example, is used when the management device 20 accesses the host device 30. The volume management program 2011 uses this IP address to acquire from the host device 30 information about the logical volume allocated to the host device 30.

Information showing the volume allocated to the host device 30 is stored under volume ID 223. In this embodiment, a value, which uses a colon to link the value of the storage ID 211 and the value of the volume ID 212 of the volume registered in the volume management information 21, is stored under volume ID 223. The reason for storing the storage ID and the volume ID together like this is to enable the volume ID to be repeated in a plurality of storage systems and to uniquely specify a volume inside the management device.

For example, in a case where the 00:01 volume of Storage 1, which is registered in the volume management information 21, is allocated to Host 1, "Storage1:00:01" is stored in the volume ID column of the record for which the host ID is "Host1". Further, in a case where a plurality of volumes have been allocated, a plurality of comma-delimited volume IDs are stored. In a case where a volume has not been allocated, n/a is stored in the volume ID column.

In a case where the volume allocated to the host device 30 is mounted on the host, information showing this mount point is stored under mount point 224. Mounting is a process for setting a logical volume allocated to the host device 30 in a usable state, for example, for allocating the logical volume to the C drive (C:) or the D drive (D:).

For example, in a case where the logical volume of volume ID "Storage1:00:01" is mounted to the C drive, information denoting C: is stored under mount point 224. In a case where the logical volume is allocated to the host device, but is not mounted to the C drive, n/a is stored. In a case where a plurality of volumes are allocated to the host 30, the respective logical volume mount points are stored as comma-delimited values in accordance with the volume ID 223 order.

Information showing the volume allocation policy used when allocating a volume to the host device 30 is stored under allocation policy 225. In a case where a plurality of volumes are allocated to the host, the volume allocation policies are stored as comma-delimited values in accordance with the volume ID 223 order the same as for the mount point 224.

When a logical volume 145 of the storage system 10 is allocated to the host device 30, the volume management program 2011 updates the records corresponding to the volume ID 223 item and the allocation policy 225 item. Also, in a case where the mounting/unmounting of a volume to the host device 30 is detected, the volume management program 2011 updates the value of the mount point 224.

Figure 9:
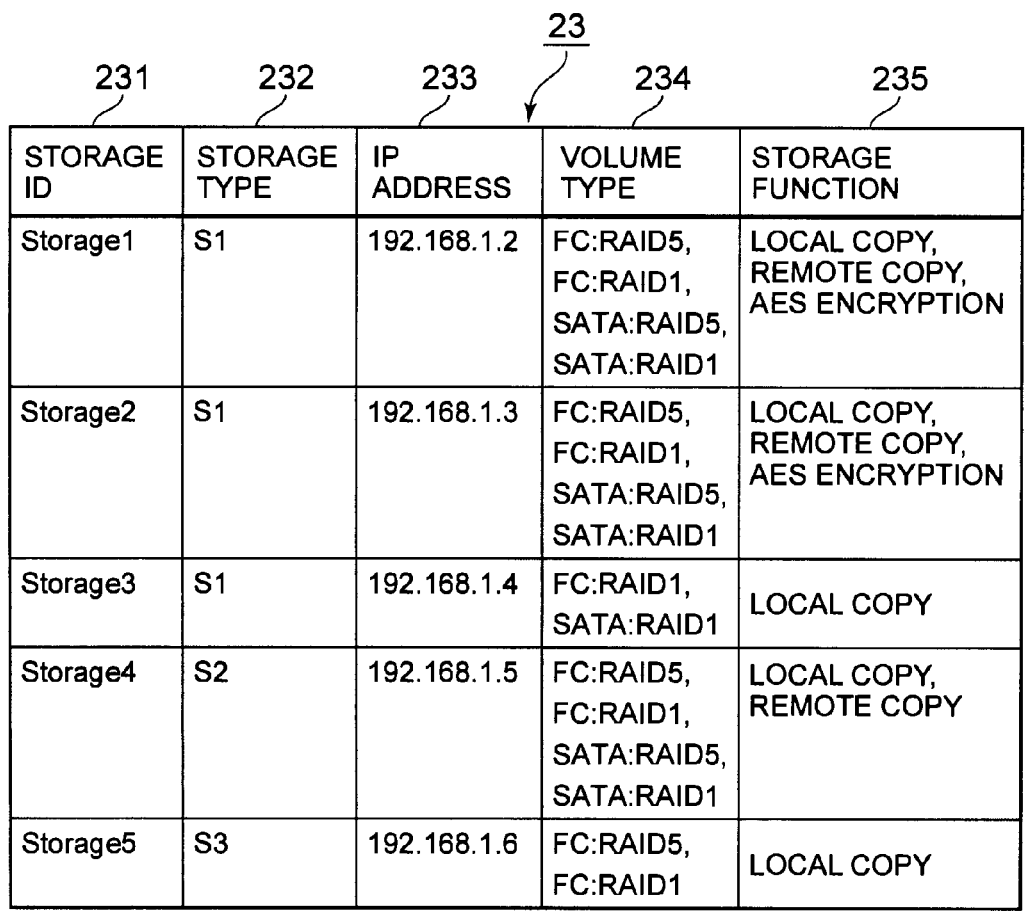
FIG. 9 is a diagram showing an example of storage function management information 23 in this embodiment.

FIG. 9 is a diagram showing an example of the storage function management information 23 in this embodiment. The format of the storage function management information disclosed in FIG. 9 is an example, and the present invention is not limited to the format shown in the drawing.

The storage function management information 23 comprises a plurality of records comprising the items storage ID 231, storage type 232, IP address 233, volume type 234 and storage function 235.

Information for the management device 20 to identify the storage system 10 is stored under storage ID 231. For example, the storage ID may be an administrator-specified nickname or the storage product number.

Information showing the type for classifying the storage system 10 is stored under storage type 232. For example, the storage type may be a storage model number or series name.

The IP address allocated to the storage system being used for the management device 20 to manage the storage system 10 is stored under IP address 233.

Information showing the volume type provided by the relevant storage is stored under volume type 234. In this embodiment, the information stored under volume type 234 is a colon-delimited value coupling the HDD type, which is the generating element of the logical volume, with the RAID group. Further, in a case where there are a plurality of volume types, this information is listed and stored as comma-delimited values. In the example of FIG. 9, Storages 1, 2 and 3 are all denoted as being the same storage type "S1". Storages 1 and 2 are shown as each being RAID groups of RAID levels RAID 5 and RAID 1 created from FCC and SATA HDDs. By contrast, Storage 3, which has the same storage model number of "S1", is shown as being configured solely of FC and SATA HDDs that are RAID 1.

The storage function 235 is a list of storage functions that are able to be used in the logical volume provided by the relevant storage. In the example of FIG. 9, "local copy" denotes the copying of data stored in a PVOL to a volume (SVOL), which is inside the same storage system, and which is configured in a RAID group that differs from the RAID group configuring the PVOL. "Remote copy" denotes the copying of data stored in a PVOL to a volume (SVOL) provided in another storage system that differs from the storage system providing the PVOL. "AES (Advanced Encryption Standard) Encryption" denotes a function for using AES to encrypt write data when storing this data in the HDD configuring the volume.

Furthermore, FIG. 9 shows storage functions provided by the storage apparatus. However, the present invention is not limited thereto, and may comprise functions that are able to be provided by a switch or host device that is connected to the storage apparatus.

In a case where these functions are able to be executed in the storage system, this information is stored in the storage function column. In a case where a plurality of functions are executable, comma-delimited information is stored. In the example of FIG. 9, volume local copy, remote copy and AES encryption are possible for Storages 1 and 2, but for Storage 3, which is the same storage type, only a local copy is capable of being executed. For example, although the respective storages are the same storage type, there may occur a case in which licenses for a portion of the storage functions have not been validated in the storage system.

In this embodiment, the premise is that a function listed under storage function 235 is applicable to all the volumes of the relevant storage. In a case where the storage function 235 is only valid for a portion of the volumes inside a storage, the management device 20 is able to deal with this by partitioning and registering a single storage as two virtual storages, one virtual storage in which the function is applicable and another virtual storage in which the function is not applicable.

The storage management program 2010 updates the storage function management information 23 upon detecting a status change in the storage system. For example, the management device 20 uses the IP address 233 to regularly monitor the statuses of the respective storage systems targeted for management. Then, upon detecting a change in status, such as at HDD addition/reduction, at RAID group creation/deletion or when a license status changes, the storage management program 2010 re-acquires storage information from the relevant storage system, and updates the storage function management information 23 in accordance with the storage system configuration and the executability of the respective functions.

FIG. 10 is a diagram showing an example of the allocation policy management information 24 related to this embodiment. The format of the allocation policy management information disclosed in FIG. 10 is an example, and the present invention is not limited to the format shown in the drawing.

A policy related to a storage condition, a volume condition and/or a storage function condition that must be satisfied when allocating a storage system 10-provided logical volume 145 to the host device 30 is registered in the allocation policy management information 24. The allocation policy management information 24 comprises a plurality of records comprising the items policy ID 241, storage condition 242, volume condition 243, storage function condition 244, application destination 245, and threshold value 246.

Information for uniquely identifying a policy is stored under policy ID 241. For example, the policy ID is an administrator-specified nickname or the like.

A condition with respect to the storage system 10 that becomes the allocation source of a volume when the relevant policy has been used is set under storage condition 242. A case in which a storage ID is directly specified under storage condition 242 indicates that only this storage system 10 is able to be used as the allocation source. A case in which a storage type is specified indicates that a storage system that satisfies this storage type is able to be used as the allocation source. Further, a plurality of storage types may be stored as comma-delimited values as with "S1, S2". In this case, a storage system 10 corresponding to either S1 or S2 is used as the volume allocation source. Furthermore, "*" is stored in a case where a storage condition is not set, and the storage system to which the volume to be allocated belongs is not important.

For example, a volume condition such as "FC:RAID5" alone could result in the allocation of a volume from an older, low-performance storage system inside the computer system 1. Accordingly, in a case where it is desirable that this volume be allocated to the host device 30 from a high-performance storage system 10, a high-performance storage system 10 type is specified as the storage condition.

A condition with respect to the volume that will become the volume allocation source when the relevant policy has been used is stored under volume condition 243. The value of the volume condition 243 is any volume type selected from the volume type 234 column of the storage function management information 23. In a case where a plurality of volume types are selected, comma-delimited values are stored. This shows that any one condition may be satisfied. For example, in a case where "FC:RAID5, FC:RAID1" is set under volume condition 243, either an FC:RAID5 volume or an FC:RAID1 volume will become the volume candidate for allocation to the host device 30. Further, "*" is stored in a case where a volume condition is not set, and a volume of any volume type may be allocated.

The type of storage function, which must be used in the volume when the relevant policy has been used, is stored under storage function condition 244. As the type of the storage function to be stored, any function is set from the values of the storage function 235 column of the storage function management information 23. In a case where a plurality of storage functions are to be used, the respective storage functions are set as comma-delimited values. In a case where a storage function will not be used, "*" is set.

The application destination 245 denotes the host 30 to which the relevant policy is to be provided. In a case where the relevant policy is applied to a plurality of host devices 30, the host device 30 IDs are stored as comma-delimited values. The application destination 245 may also be repeated among a plurality of policies. In the example of FIG. 10, to Host 3 and Host 4, the volumes of a local copy-configured volume allocated on the basis of Policy 2 and a remote copy-configured volume allocated on the basis of Policy 3 are allocated. Furthermore, in FIG. 10, the host device 30 is set as the application destination 245, but another target may be used provided that a volume is capable of being allocated thereto. In this embodiment, a Policy is applied to each host device 30, but the present invention is not limited to this. For example, a Policy may be applied to each application executed by a host device 30. In a case where a plurality of users use a single host device 30, a Policy may be set for each user.

In accordance with the administrator registering a volume allocation policy in conformance to a requirement requested by an application program run on the host device 30, it is possible to constantly provide a volume that satisfies the requirements of the host at volume provisioning, and it is also possible to determine how many volumes that satisfy these requirements remain inside the information processing system 1.

In a case where the "storage function condition" in the allocation policy management information 24 of FIG. 10 is a local copy, a volume that satisfies the "storage condition" and the "volume condition" for both the PVOL and the SVOL is selected and allocated. In a case where the "storage function condition" is a remote copy, a volume that satisfies the "storage condition" and the "volume condition" for both the PVOL and the SVOL is also selected and allocated.

Furthermore, in a case where functions that use a plurality of volumes, such as a local copy and a remote copy, are included in the storage function condition, for example, the "storage condition" and the "volume condition" may be set separately for the PVOL and the SVOL.

<Flow of Processing in this Embodiment>

The processing in the computer system at each phase of storage operation using a volume allocation policy will be explained using FIGS. 11 through 24.

<Volume Allocation Policy Registration>

FIG. 11 is a diagram showing a flowchart of the process in this embodiment for registering a volume allocation policy.

When the administrator requests that the management client device display the policy registration screen, a policy registration screen display request is notified to the management device 20 (S1101).

The policy management program 2012 of the management device 20, which receives the request, references the storage function management information 23 and respectively creates a list (a storage condition list) comprising the values for both the storage ID 231 and the storage type 232, a list (a volume type list) of volume types comprising the values of the volume type 234, and a list (a storage function condition list) of storage functions comprising the values of the storage function 235 for the storage systems capable of being selected inside the computer system 1 (S1102). The respective lists comprise only one value that is repeated in the items of the storage function management information. For example, in the case of FIG. 9, the value FC:RAID5 appears a plurality of times when referring to the volume type 234, but the value FC: RAID5 is added only once to the volume condition list.

The policy management program 2012 references the host management information 22, and creates a list of host devices (a host list) (S1103).

Figure 12:
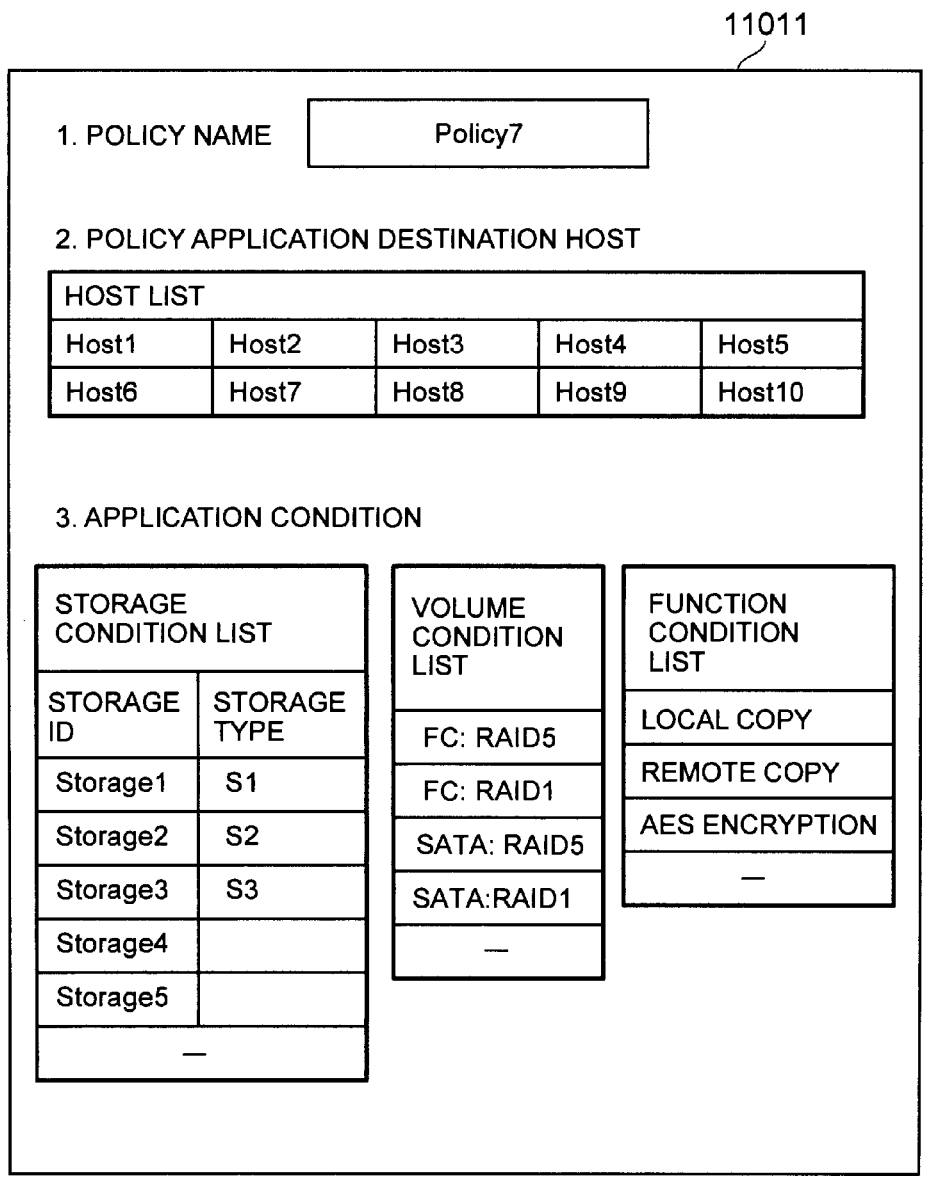
FIG. 12 is a diagram showing an example of a volume allocation policy registration screen in this embodiment.

When creation of the respective lists is complete, the policy management program 2012 displays the policy registration screen on the management client device (S1104). FIG. 12 is a diagram showing an example of the volume allocation policy registration screen 1101 in this embodiment. The respective values of the storage condition list, the volume condition list, the storage function condition list and the host list are selectable in the policy registration screen.

The administrator registers an allocation policy from the displayed information (S1105). Specifically, the administrator inputs into the management client device 40 the name of a volume allocation policy from the volume allocation policy registration screen (1. in the volume allocation policy registration screen). The administrator selects the host that will apply this allocation policy from the host list (2. in the volume allocation policy registration screen). The administrator selects the storage condition and volume condition that will serve to restrict the volume allocation source from the respective lists, and selects the storage function(s) that will be used in the volume from the storage function condition list (3. in the volume allocation policy registration screen). When the administrator finishes the inputting to the volume registration screen, this input content is sent to the policy management program 2012 of the management device 20.

Next, the policy management program 2012, which receives the input content, references the policy management information 24 to check whether or not a policy has already been registered in the same setting item (S1106). In a case where the same policy has already been registered (S1106a), the policy management program 2012 notifies the management client device 40 to this effect. In a case where the same policy has not been registered (S1106b), the policy management program 2012 boots up the capacity computation program 2013, and computes the capacity of a volume that is able to be allocated under the inputted policy (S1107). The processing of the capacity computation unit will be explained in detail further below.

In a case where the result of computing the allocatable capacity is that allocatable capacity is able to be reserved, the policy management program 2012 registers the relevant policy in the policy management information 24 as-is, and notifies the management client device 40 that registration was successful. In a case where it is not possible to reserve the allocatable capacity, the policy management program 2012 notifies the management client device 40 that the capacity capable of being reserved under the current policy is not available.

This completes the explanation of the volume allocation policy registration process.

<Allocatable Capacity Computation Process (1)>

Figure 13:
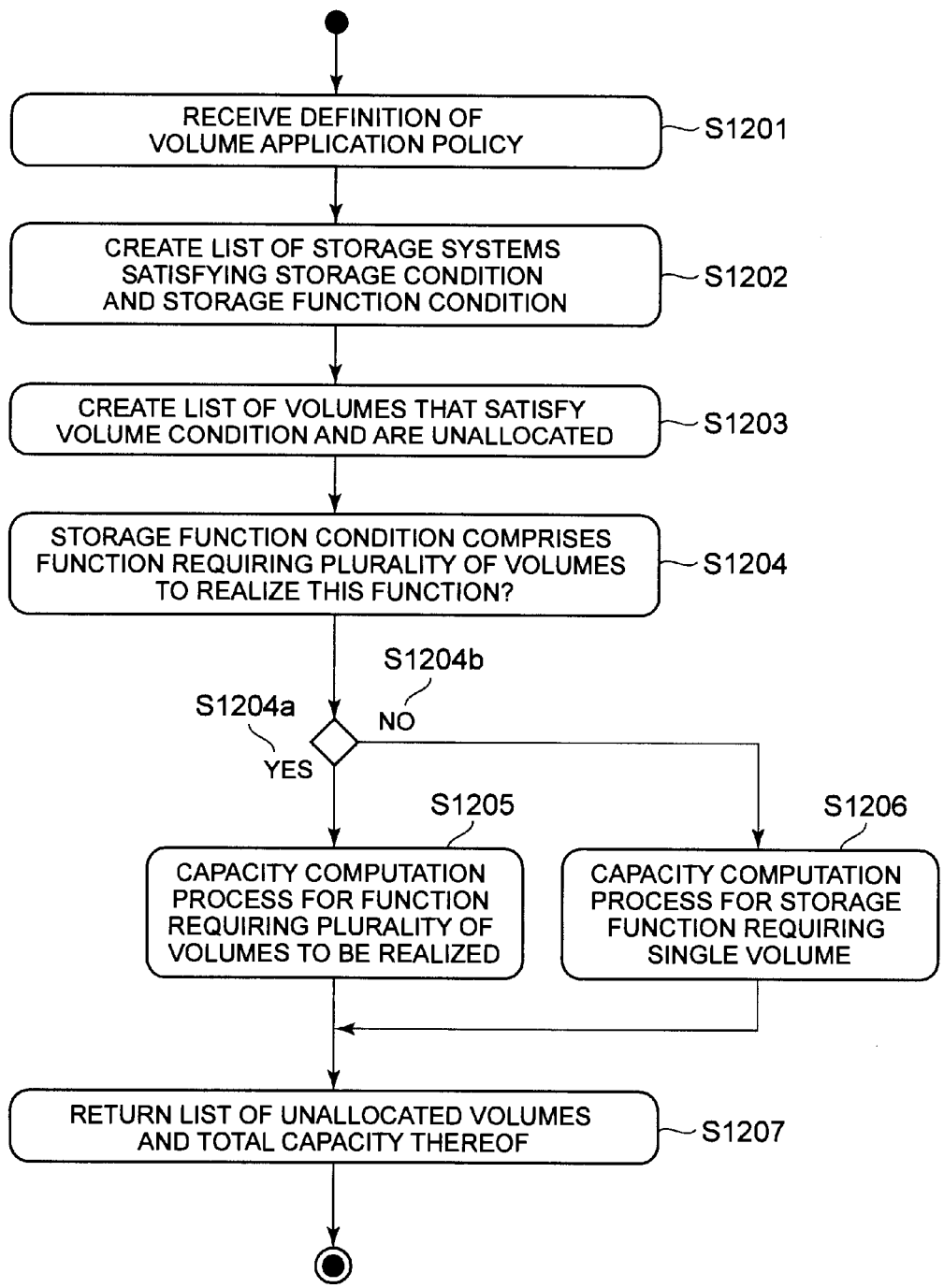
FIG. 13 is a diagram showing an example of an allocatable capacity computation process (1) in this embodiment.

FIG. 13 is a diagram showing an example of a flowchart of a process in this embodiment for computing the allocatable capacity. The allocatable capacity computation process is executed by the capacity computation program 2013.

The management device 20 receives either a volume allocation policy definition or a volume policy ID (S1201). A volume allocation policy definition comprises a storage condition, a volume condition and a storage function condition. In a case where a volume policy ID is received, the capacity computation program 2013 references the policy management information 24 and acquires the storage condition, the volume condition, and the storage function condition from each of the items storage condition 242, volume condition 243 and storage function condition 244 with respect to this policy ID. The following explanation will assume that in this embodiment storage condition "a", volume condition "b" and storage function condition "c" are acquired.

The capacity computation program 2013 references the storage ID 231, the storage type 232 and the storage function 235 in the storage function management information 23, selects the storage system 10 that comprises the storage function condition c corresponding to the storage condition a, and creates a list of the selection results (storage list "a") (S1202). For example, in a case where S1 is specified as the storage condition "a", and local copy and AES encryption are specified as the storage function condition in the case of the storage function management information 23 of FIG. 9, from among Storages 1, 2 and 3, a storage list "a" comprising only Storages 1 and 2, which are able to use the local copy and AES encryption, is created.

Next, the capacity computation program 2013 creates a list (volume list "a") of the volumes that satisfy the volume condition b from among the unallocated volumes of each storage of the storage list "a" (S1203). Specifically, the capacity computation program 2013 selects a storage system from the storage list "a", and acquires information about the volume type 213 and the allocation destination 216 of the selected storage system from the volume management information 21. Then, the capacity computation program 2013 matches the volume type 213 and the volume condition "b", and lists up the volume(s) that have an allocation destination of "n/a (Unallocated)". The capacity computation program 2013 executes this processing for all the storage systems included in the storage list "a". In a case where Storages 1 and 2 are included in the storage list "a", the capacity computation program 2013 references the volume management information 21, selects a volume(s) that has an allocation destination of "n/a (Unallocated)", and creates a volume list.

As mentioned above, a volume(s) that satisfies the specified storage condition, volume condition, and storage function condition, and, in addition, is unallocated is listed up on the volume list "a".

Next, the capacity computation program 2013 checks whether or not a function, which requires a plurality of volumes to realize this storage function, is included in the storage function condition "a" specified as the input parameter (S1204). As one example, a function for creating a copy pair in accordance with two or more logical volumes will be cited. That is, the capacity computation program 2013 checks whether or not either local copy, which requires a PVOL and SVOL inside the same storage, or remote copy, which requires a PVOL and an SVOL of a storage system that differs from that of this PVOL, is included in the storage function condition "a".

Figure 14:
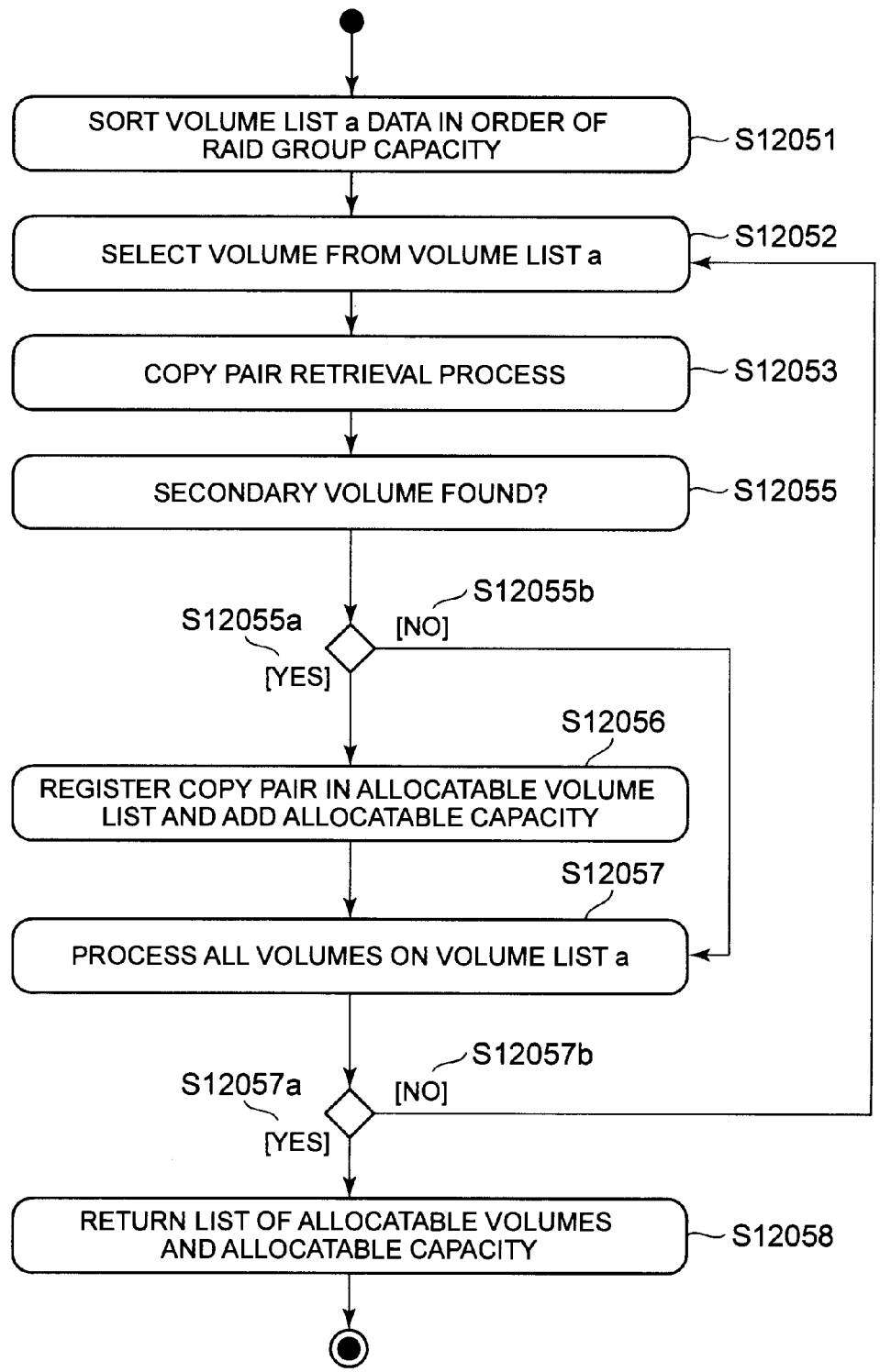
FIG. 14 is a diagram showing an example of an allocatable capacity computation process (2) in this embodiment.

For example, in a case where either local copy or remote copy is included in the storage function condition (a case in which S1204a:S1204 is YES), the capacity computation program 2013 carries out capacity computation processing in accordance with the flowchart of FIG. 14.

By contrast, for example, in a case where neither local copy nor remote copy is included in the storage function condition (a case in which S1204b:S1204 is NO), the capacity computation program 2013 references the volume management information 21 and computes the capacity of each volume included on the volume list.

<Allocatable Capacity Computation Process (2)>

FIG. 14 is a diagram showing an example of a process for computing the capacity capable of being provided to a storage function that requires a plurality of volumes, such as a local copy or a remote copy.

The capacity computation program 2013 references the volume management information 21, checks the capacity of each volume included on the volume list "a" (the list of volumes that satisfy storage condition "a", volume condition "b" and storage function condition "c", and, in addition, are not allocated), and computes the allocatable capacity for each RAID group. Then, the capacity computation program 2013 sorts the volume list "a" in descending order from the volume belonging to the RAID group having the largest allocatable capacity (S12051). When sorting the volume list "a" at this time, the capacity computation program 2013 may also sort the order of the volumes included in the RAID groups in descending order from the volume having the largest capacity.

A counter flag of each volume is set to "false" at this time. The counter flag is the flag showing whether or not the capacity of the volume has already been computed as an allocatable capacity in the capacity computation process. "True" denotes that the volume has been counted, and "false" denotes that the volume has not been counted. Further, in this embodiment, the volumes are sorted in descending order from the RAID group with the largest free capacity, but a different sorting algorithm may be used.

The capacity computation program 2013 selects, from among the volumes of the volume list "a" sorted in S12051, a volume, which has a counter flag of "false", and which is at the top of the list (S12052). The capacity computation program 2013 sets the counter flag of the selected volume to "true". This volume becomes a primary volume (PVOL) candidate of a copy pair.

The capacity computation program 2013 executes a copy pair retrieval process (S12053). The copy pair retrieval process retrieves a local copy pair and a remote copy pair from the volume list "a".

In a case where local copy is specified in the storage function condition "a", the capacity computation program 2013 executes a local copy pair retrieval process. The process for retrieving an SVOL that corresponds to the PVOL selected in S12052 will be explained below.

The capacity computation program 2013, from the volume list "a", retrieves a volume that is on a RAID group that differs from the RAID group to which the PVOL belongs in the storage system 10 to which the selected PVOL belongs. Then, the capacity computation program 2013 selects as the SVOL the volume for which the counter flag is false of the retrieved volumes. Selecting as the SVOL here a volume that is on a RAID group that differs from the RAID group to which the PVOL belongs makes it possible to restore information in accordance with the SVOL even when a failure occurs in a portion of the storage device and read/write processing is not able to be carried out to the PVOL. Further, in a case where a plurality of volumes have been retrieved, the capacity computation program 2013 may select as the SVOL the volume with a capacity that most closely approximates the capacity of the PVOL. Using an SVOL with a capacity that most closely approximates the capacity of the PVOL makes it possible to prevent wasted capacity allocation while allocating the capacity needed by the SVOL.

Further, when selecting the SVOL, the capacity computation program 2013 may select a volume with a capacity that is greater than that of the PVOL. This is because a capacity that is greater than the capacity of the PVOL is necessary in order to copy and write the PVOL data to the SVOL.

In a case where a certain volume has been selected as the SVOL, the counter flag of the selected volume is set to "true". Failure to select any volume as the SVOL signifies that it is not possible to select an SVOL for creating a local copy pair in a case where the volume selected in S12052 was used as the PVOL.

In a case where remote copy is specified in the storage function condition a, the capacity computation program 2013 executes a remote copy pair retrieval process. The process for retrieving an SVOL that corresponds to the PVOL selected in S12052 will be explained below.

The capacity computation program 2013, from the volume list "a", retrieves a volume belonging to a storage system that differs from the storage system to which the selected PVOL belongs. Then, from among the retrieved volumes, the capacity computation program 2013 selects as the SVOL the volume(s) having a counter flag of false. In a case where a plurality of volumes are retrieved here, the capacity computation program 2013 may select as the SVOL the volume with a capacity that most closely approximates the capacity of the PVOL.

Further, when selecting the SVOL, the capacity computation program 2013 may also select a volume with a capacity that is greater than that of the PVOL.

In a case where a certain volume has been selected as the SVOL, the counter flag of the selected volume is set to "true". Failure to select any volume as the SVOL signifies that it is not possible to select an SVOL for creating a local copy pair in a case where the volume selected in S12052 is the PVOL.

The capacity computation program 2013 checks whether or not an SVOL has been selected as a result of executing the copy pair retrieval process in S12053 (S12055).

A case in which the SVOL was selected (S12055a) signifies that it is possible to form a copy pair via either a local copy or a remote copy, which is the condition specified in the storage function condition "a". Therefore, the capacity computation program 2013 adds a pair comprising a PVOL and a SVOL to the allocatable volume list (volume list "b"). Then, the capacity computation program 2013 compares the PVOL capacity with the SVOL capacity, and adds whichever capacity is smaller to the capacity capable of being allocated to the host device. Whichever capacity, i.e. the PVOL capacity or the SVOL capacity, is deemed larger as a result of the comparison is not added to the allocatable capacity at this time. Since the capacity that the host is able to use as a copy pair may not exceed the capacity of either the PVOL or the SVOL, this process makes it possible to accurately determine the volume capacity capable of being used by the host.

When selecting the SVOL, in a case where the capacity computation program 2013 selects a volume that has a larger capacity than the PVOL, the program 2013 may add the capacity of the PVOL to the allocatable capacity without comparing the two (S12057). Since the capacity of the SVOL is the secondary volume of the copy pair, and is not a capacity that the host is able to use, this capacity is not added to the allocatable capacity at this time. Adding only the capacity of the pairable PVOL to the allocatable capacity makes it possible to satisfy the storage function condition required by the allocation policy and to accurately determine the host-usable volume capacity.

Thereafter, the capacity computation program 2013 checks whether or not the counter flags of all the volumes stored in the volume list "a" are "true" (S12057). That is, the program 2013 checks to make sure processing has been executed for all the volumes included on the volume list "a". In a case where a volume with a counter flag that is "false" exists in the volume list "a" (S12057b), the capacity computation program 2013 returns to S12052 and repeats the processing of this step and the series of processes of the steps subsequent thereto. When processing has been completed for all the volumes (S12057a), the capacity computation program 2013 returns the allocatable volume list "b" and the allocatable capacity to the invoker (S12058).

When all of the above-mentioned processing is complete, the capacity computation program 2013 returns the list of unallocated volumes that satisfy the volume allocation policy specified in the input parameter and the total allocatable volume capacity to the invoker (S12058).

In the above explanation, a local copy and a pair were explained as one generation. However, the pair generation may be N generations. In the case of N generations, the copy pair retrieval process of S12053 is executed as follows.

The capacity computation program 2013, from the volume list "a", retrieves a volume that is on RAID group that differs from the RAID group to which the PVOL belong in the storage system 10 to which the selected PVOL belongs. Then, the capacity computation program 2013 selects as SVOL1 (the first generation SVOL) the volume for which the counter flag is false of the retrieved volumes. In a case where a plurality of volumes have been retrieved here, the capacity computation program 2013 selects the volume with a capacity that most closely approximates the capacity of the PVOL and makes this the SVOL1. Further, when selecting the SVOL1, the capacity computation program 2013 may select a volume that has a larger capacity than the PVOL. Next, the capacity computation program 2013, from the volume list "a", retrieves a volume on a RAID group, which differs from the RAID group to which the PVOL belongs, and which differs from the RAID group to which the SVOL1 belongs. Then, from among the retrieved volumes, the capacity computation program 2013 selects the volume having a false counter flag as the SVOL2 (the second generation SVOL). In a case where a plurality of volumes have been retrieved here, the capacity computation program 2013 selects the volume with a capacity that most closely approximates the capacity of the PVOL and makes this volume the SVOL2. Further, when selecting the SVOL2, the capacity computation program 2013 may select a volume that has a larger capacity than the PVOL. The capacity computation program 2013 selects SVOLs in the same way hereafter up to the N generation.

In a case where a local copy covers multiple generations, the number of RAID groups does not necessarily have to be proportional to the number of generations. For example, in a case where the local copy covers two generations, the RAID groups of the PVOL and SVOL will be RAID groups with different physical failure uses, but in this case the main purpose is to have a plurality of backup generations for these two generation SVOL and physical redundancy is not required. In accordance with this, when retrieving a second generation or later SVOL, the capacity computation program 2013 retrieves a volume on a RAID group that differs from the PVOL the same as in the case of the first generation SVOL.

In other words, the copy pair retrieval process of S12053 is executed as follows.

The capacity computation program 2013, from the volume list "a", retrieves a volume on a RAID group that differs from the RAID group to which the PVOL belongs in the storage system 10 to which the selected PVOL belongs. Then, from among the retrieved volumes, the capacity computation program 2013 selects as the SVOL1 (the first generation SVOL) the volume having the false counter flag. In a case where a plurality of volumes have been retrieved here, the capacity computation program 2013 selects the volume with a capacity that most closely approximates the capacity of the PVOL and makes this volume the SVOL1. Further, when selecting the SVOL1, the capacity computation program 2013 may select a volume that has a larger capacity than the PVOL. Next, the capacity computation program 2013, from the volume list "a", retrieves a volume on a RAID group that differs from the RAID group to which the PVOL belongs. Then, from among the retrieved volumes, the capacity computation program 2013 selects the volume with the false counter flag as the SVOL2 (the second generation SVOL). In a case where a plurality of volumes have been retrieved here, the capacity computation program 2013 selects the volume with a capacity most closely approximating the capacity of the PVOL and makes this volume the SVOL2. Further, when selecting the SVOL2, the capacity computation program 2013 may select a volume that has a larger capacity than the PVOL. The capacity computation program 2013 selects SVOLs in the same way hereafter up to the N generation.

In a case where it is possible to collectively specify the provisioning of the PVOL and SVOL and the storage condition when specifying remote copy as the condition in the policy management table, only volumes on RAID groups provided by the respective storages will be targeted for processing when selecting the PVOL and the SVOL.

That is, when selecting a candidate PVOL in S12052, the capacity computation program 2013, from the volume list "a", retrieves and selects a volume on a storage specified in the storage condition of the PVOL and sets the counter flag of this volume to true. Next, in the copy pair retrieval process of S12053, the capacity computation program 2013, from the volume list "a", retrieves a volume on a storage that satisfies the storage condition specified for the SVOL. Then, from among the retrieved volumes, the capacity computation program 2013 selects as the SVOL the volume having the false counter flag. In a case where a plurality of volumes have been retrieved here, the capacity computation program 2013 selects the volume with a capacity that most closely approximates the capacity of the PVOL and makes this volume the SVOL. Further, when selecting the SVOL, the capacity computation program 2013 may select a volume that has a larger capacity than the PVOL. The capacity computation program 2013 repeats this processing until all of either the volumes of the PVOL storage condition or the volumes that satisfy the SVOL storage condition have been processed.

<Policy-based Provisioning Process>

Figure 15:
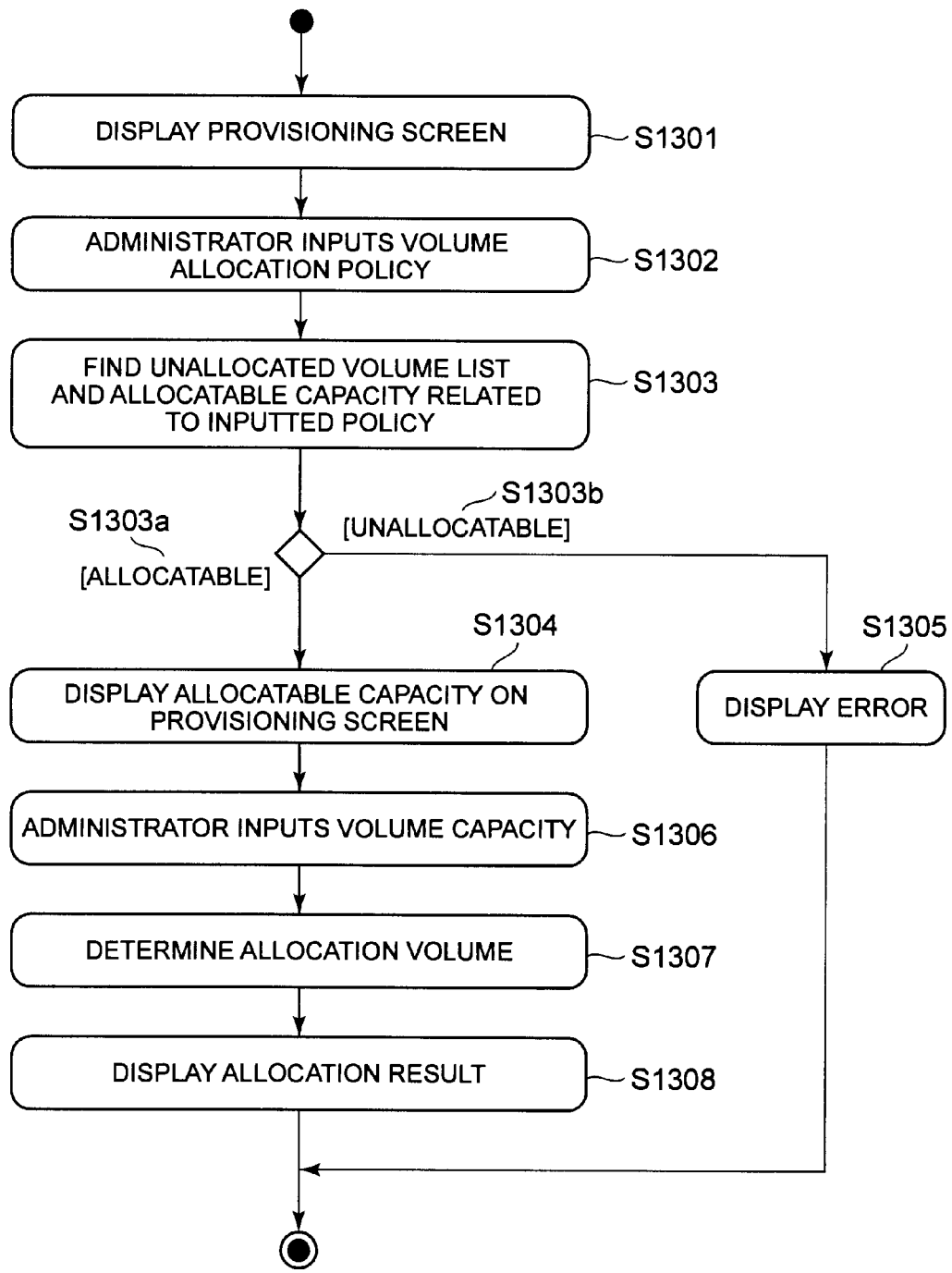
FIG. 15 is a diagram showing an example of a flowchart of a process (provisioning process) in this embodiment for allocating a storage system volume to a host in accordance with a policy.

FIG. 15 is a diagram showing an example of a flowchart of a process (a provisioning process) in this embodiment for allocating a storage system volume to a host device in accordance with a policy.

Figure 16:
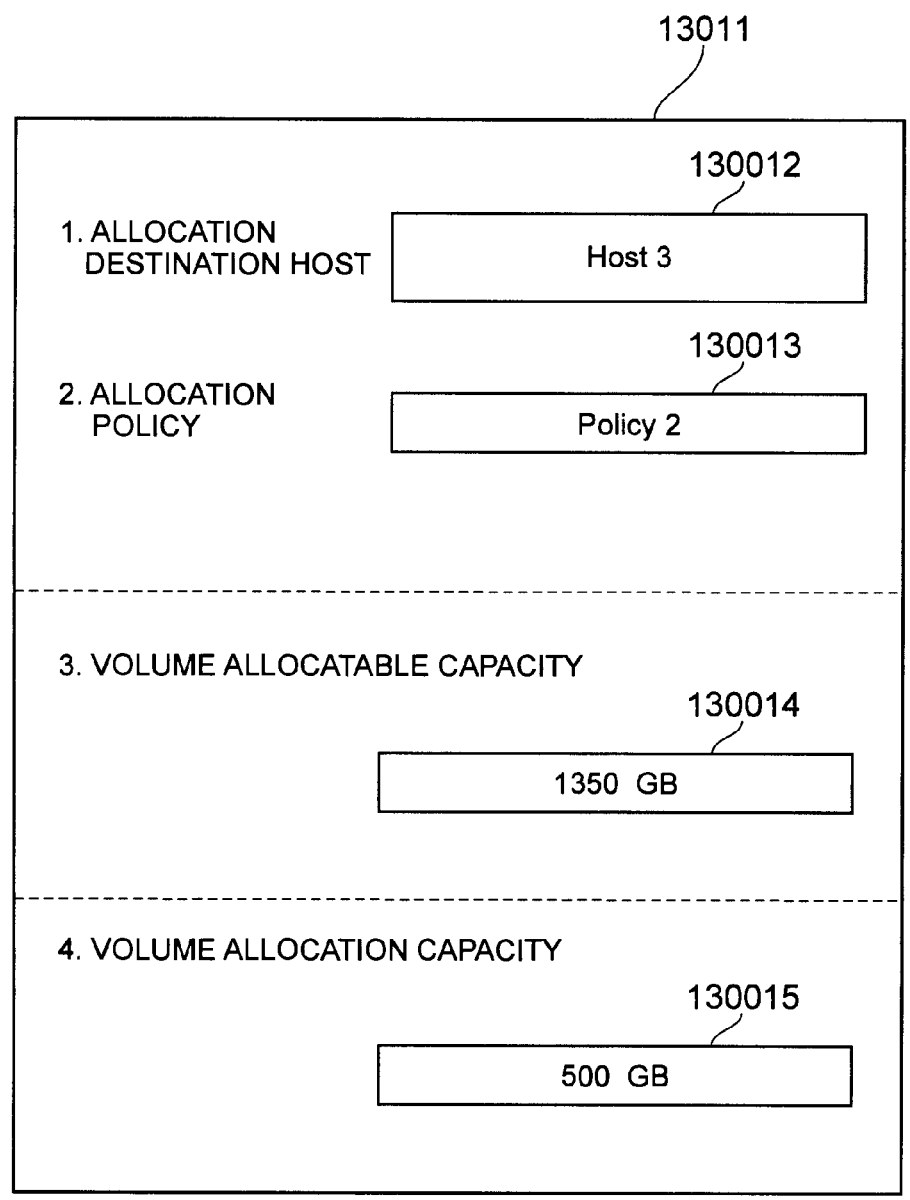
FIG. 16 is a diagram showing an example of a provisioning screen 13011 in this embodiment.

The administrator selects a host device 30 via the input device 404 of the management client device 40. The management client device 40, together with the selected host device 30, issues an instruction to the management device 20 to start a provisioning process to the selected host device 30. The management device 20, which receives the provisioning process start instruction, issues an instruction to the output device 405 of the management client device 40 to display a provisioning screen 13011 (S1301). The management device 20 references the host management information 22, and issues an instruction to display the provisioning screen 13011 in a state in which the policy registered in the allocation policy 225 of the selected host device 30 is selected. In a case where a plurality of policies are registered, the management device 20 instructs that the provisioning screen 13011 be displayed in a state in which the first policy is selected. In a case where the allocation policy has not been defined, the management device 20 instructs that the provisioning screen 13011 be displayed in a state in which the policy is not selected. FIG. 16 is a diagram showing an example of the provisioning screen 13011 in this embodiment.

In a case where the allocation policy has not been defined, the administrator inputs the volume allocation policy to the allocation policy column of the provisioning screen via the input device 404 of the management client device 40 (S1302). A policy stored in the allocation policy management information 24 may be selected as the volume allocation policy. Further, the administrator may define and input a new volume allocation policy. In a case where a new volume allocation policy is to be defined, the administrator executes the policy registration process explained using FIG. 11.

The capacity computation program 2013 of the management device 20 acquires from the management client device 40 a volume allocation policy ID. In a case where a plurality of policies are registered in the relevant host, the capacity computation program 2013 acquires the ID of the policy selected on the provisioning screen 13011. Then, the capacity computation program 2013 acquires the unallocated volume list and allocatable capacity corresponding to the acquired policy ID by executing the processes explained using FIGS. 13 and 14 (S1303).

In a case where the result of the allocatable capacity computation process is that volume allocatable capacity exists (S1303a), the management device 20 issues an instruction to the management client device 40 to display the allocatable capacity on the provisioning screen 13011 (S1304). In a case where volume allocatable capacity does not exist (S1303b), the management device 20 issues an instruction to display on the provisioning screen 13011 either that provisioning is not possible using the selected volume allocation policy or that there is "0" allocatable capacity based on the selected volume allocation policy (S1305). Furthermore, in this embodiment, the total capacity of all the volumes capable of allocating capacity is displayed, but a list of allocatable volumes and the capacity thereof may all be displayed.

The administrator inputs the capacity of the volume to be allocated into the provisioning screen 13011 via the input device 404 of the management client device 40 (S1306). However, in a case where the administrator checks the allocatable capacity and determines that there is not enough allocatable capacity for the selected allocation policy, the administrator may re-input the allocation policy. In accordance with this, the processing of S1302 is executed once again.

The volume management program 2011 of the management device 20 determines the volume to be allocated based on the inputted volume capacity (S1307). At this point, the volume management program 2011 retrieves from the volume list acquired in S1303 a volume having a capacity that is larger than the volume to be allocated, and selects this volume as the volume to be allocated. Further, in a case where a plurality of volumes are stored on the volume list, the volume management program 2011 may select a plurality of volumes to make the total capacity larger than the capacity of the volume to be allocated. Then, the volume management program 2011 issues an instruction to the storage system 10 to allocate the determined volume to the host device. Furthermore, at volume allocation time, the volume management program 2011 may also execute the allocation process after having the administrator check the contents of the volume to be allocated one time. Then, the volume management program 2011 issues an instruction to the storage system 10 to allocate the determined volume to the host device.

Lastly, the storage control program of the storage system 10 executes the volume allocation process, and when the process is complete, the management device 30 notifies the management client device 40 of the allocation result (S1308).

In accordance with the above processing, it is possible to display the capacity capable of being used in conformance to a user-specified volume allocation policy and to carry out the allocation of the volume within the scope of this capacity.

In this processing, only the allocatable capacity is displayed after the user selects the allocation policy, but the processing may be carried out in such a way that it is possible to display the list of unallocated volumes acquired in S1303 and the capacity of each of these volumes on the provisioning screen, and for the administrator to select the volume to be allocated from this list.

Further, processing may also be carried out so as to add processes before and after provisioning to compute the allocatable capacity for each volume allocation policy registered in the policy management information 24, and to display a list of the volume allocation policies with respect to which the allocatable capacity decreased resulting from the allocation of the volume and this decreased capacity as the volume allocation result.

<Display of Report Based on Volume Allocation Policy>

Figure 17:
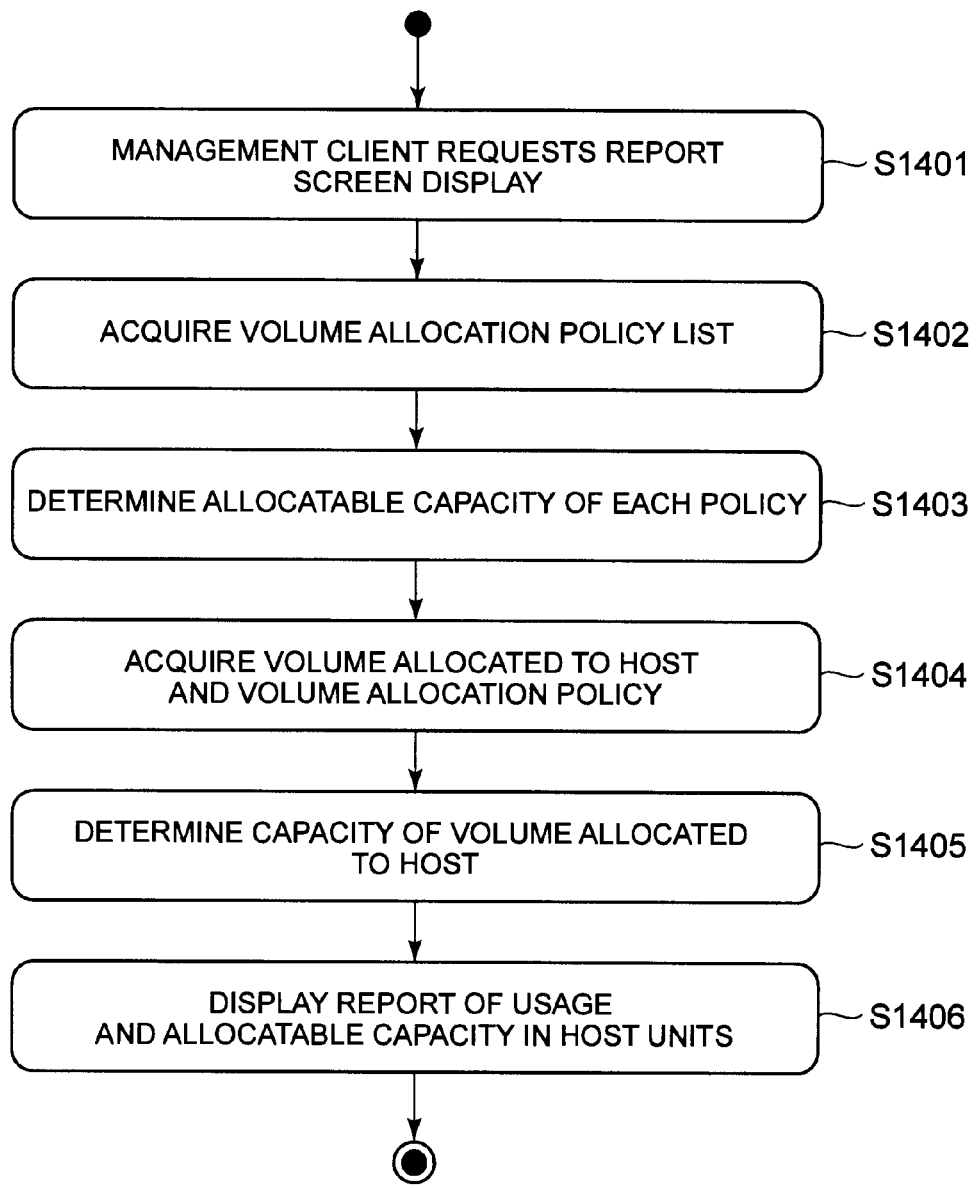
FIG. 17 is a diagram of an example of a flowchart of a process in this embodiment for reporting a volume usage and an allocatable capacity.

FIG. 17 is a diagram showing an example of a flowchart of a process in this embodiment for reporting the volume usage and allocatable capacity of a volume.

First, the administrator selects the report screen display on the input device 404 of the management client device 40. Then, the management client device 40 sends a report screen display request to the report generation program 2014 of the management device 20 (S1401).

The report generation program 2014 acquires a list of volume allocation policies by referencing the policy management information 24 (S1402).

With respect to the acquired policy list, the capacity computation program 2013 computes the allocatable capacity for each policy by using the ID of each policy as the parameter (S1403). The process for computing the allocatable capacity is in accordance with the steps shown in FIGS. 13 and 14.

The report generation program 2014 references the host management information 22, and creates a list comprising combinations of registered host devices 30, the volumes allocated to the respective host devices 30, and the allocation policies applied to the host devices 30 (S1404).

Next, the report generation program 2014 references the volume management information 21 and computes for each host device and each policy the total capacity of the volume allocated to the host device 30 (S1405).

Figure 18:
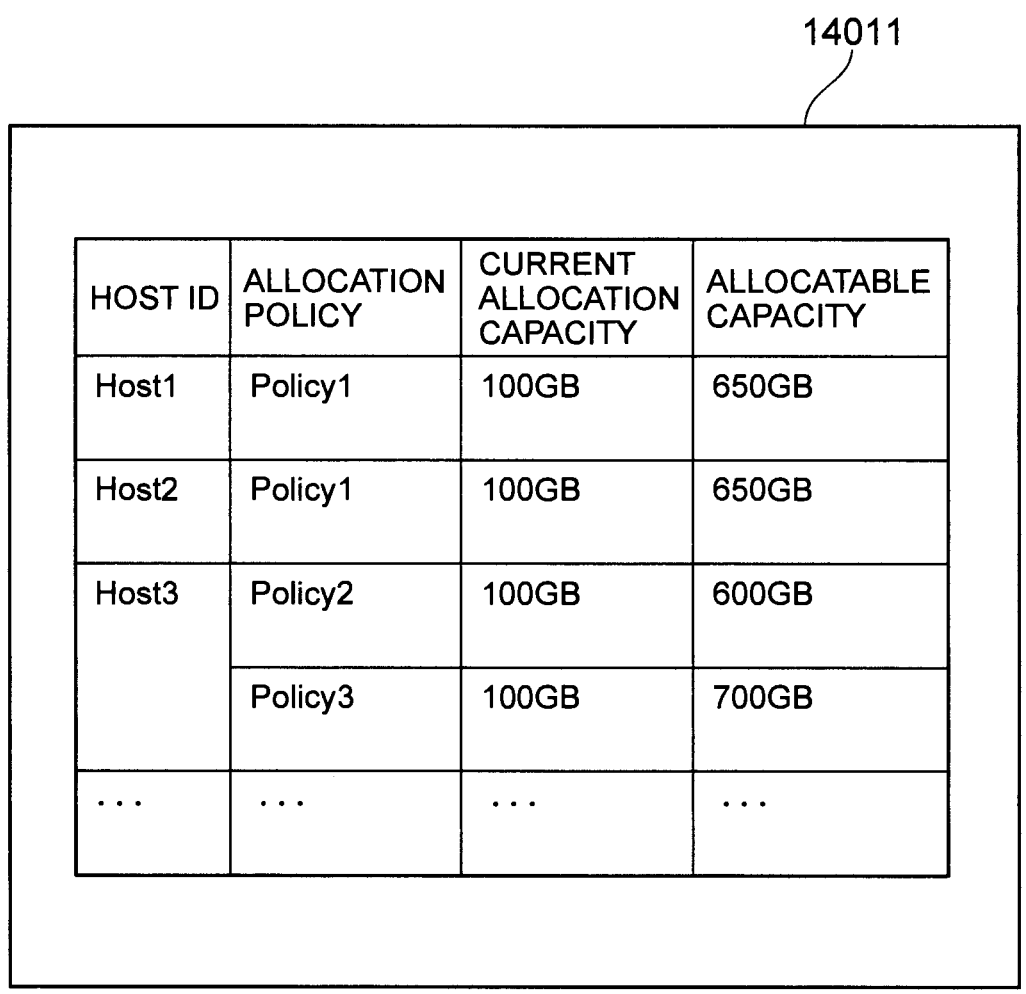
FIG. 18 is a diagram showing an example of a reporting screen in this embodiment.

When the above processing is complete, the report generation program 2014 generates a report comprising a host device 30 and the capacity currently allocated to the host device 30, the allocation policy being applied to this host device 30, and the usable capacity of this allocation policy. Then, the report generation program 2014 issues an instruction to the management client device 40 to display the generated report (S1406). FIG. 18 is a diagram showing an example of the report screen in this embodiment.

The management client device 40 displays the volume allocatable capacity for each volume allocation policy applied to the respective host devices 30. In accordance with the display of the volume allocatable capacity, the administrator is able to directly discern how much usable capacity remains of the volume capacity that the storage system is currently able to provide from the standpoint of the host, that is, the standpoint of the application-provided services running on the host device 30. This makes it possible to support a capacity expansion plan.

In FIG. 18, the policy name of the allocation policy is displayed in the report, but the content defined in the policy may also be displayed in addition to the policy name.

Also, in FIG. 18, the report is displayed with the host as the starting point, but the report may also have the policy as the starting point and may display the current allocation capacity, the allocatable capacity and a list of hosts to which policies are allocated.

<Capacity Expansion Process>

A number of processing schemes that supports the administrator by proposing a method for changing the configuration from the management device 20 in a case where the capacity of the volume capable of being allocated to the host device is insufficient will be explained.

Figure 19:
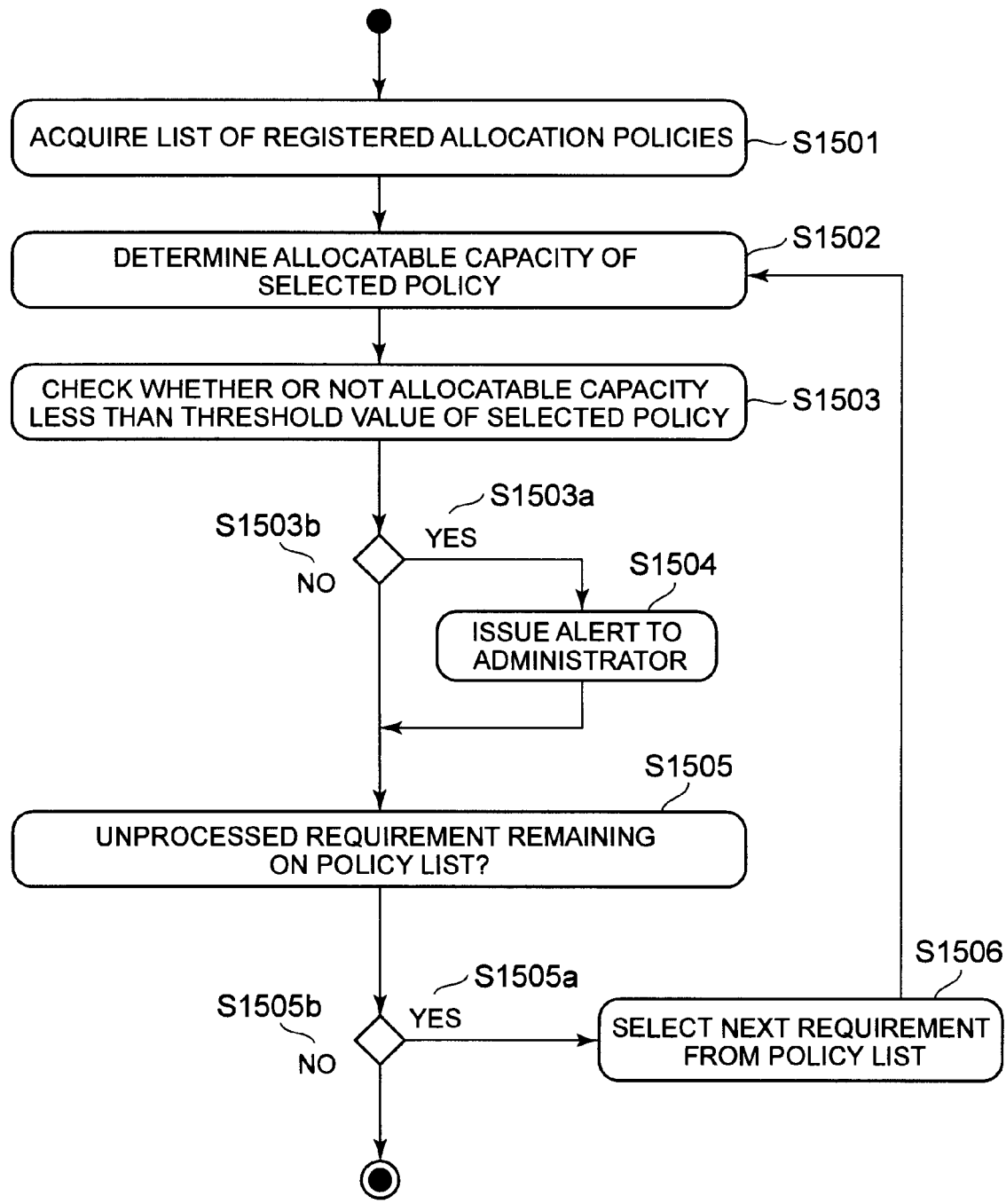
FIG. 19 is a diagram showing an example of a flowchart of a process in this embodiment for notifying a user of an alert to in a case where the allocatable capacity was less than a threshold value with respect to the policy.

FIG. 19 is a diagram showing an example of a flowchart of a process in this embodiment for alerting the user in a case where the allocatable capacity is less than a threshold value with respect to a policy.

The capacity expansion proposal program 2015 acquires a list of the allocation policies registered in the policy management information 24 and selects the first policy (S1501).

The management device 20 executes the capacity computation program 2013 using the selected volume allocation policy as the input parameter, and computes the allocatable capacity for the relevant policy (S1502).

The capacity expansion proposal program 2015 checks whether or not the allocatable capacity is less than the threshold value 246 in the policy management information 24 (S1503). In a case where the allocatable capacity is less than the threshold value 246 (case of S1503a:YES), the capacity expansion proposal program 2015 alerts the administrator using a predetermined method (S1504). For example, an e-mail or SNMP trap may be used.

In a case where the allocatable capacity is not less than the threshold value 246 (case of S1503b:NO), or when the alert notification (S1504) is complete, the capacity expansion proposal program 2015 checks whether or not an unprocessed policy remains on the list of allocation policies acquired in S1501 (S1505).

In a case where an unprocessed policy exists (case of S1505a:YES), the capacity expansion proposal program 2015 selects the next policy from the list of policies (S1506), and repeats the execution of the process executed in S1502. In a case where there are no unprocessed policies on the policy list (case of S1505b:NO), this processing ends. The management device 20 may execute this processing regularly, or this processing may be executed in accordance with an instruction from the administrator.

In accordance with the above processing, an alert related to a volume allocation policy for which the remaining capacity has decreased is notified from the management device 20 side.

Figure 20:
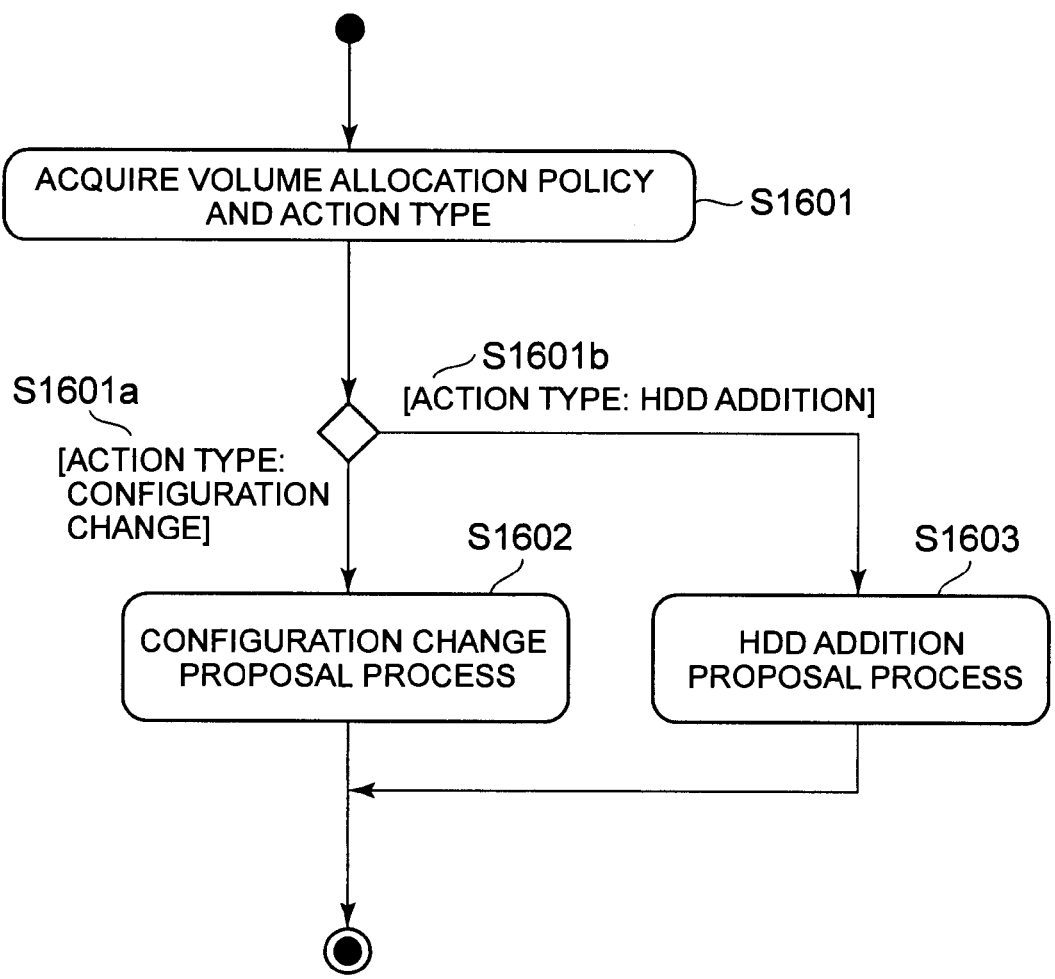
FIG. 20 is a diagram showing an example of a flowchart of a process in this embodiment for proposing a configuration change to the administrator.

FIG. 20 is a diagram showing an example of a flowchart of a process in this embodiment for proposing a configuration change to the user in a case where allocatable capacity has decreased. This process may be executed when an alert has been issued in S1504 of FIG. 19.

When the administrator selects a volume allocation policy and an action type on the management client device 40 for increasing allocatable capacity, the allocation policy ID and the action type are sent to the capacity expansion proposal program 2015 (S1601). The action type is a value denoting either "Increase free capacity by changing the volume allocation configuration of the storage system" or "Increase free capacity by adding more HDDs". Furthermore, the user may select an arbitrary volume allocation policy for increasing capacity, or may select a policy that generates an alert.

The capacity expansion proposal program 2015, which receives the request, executes a configuration change proposal process (S1602) in a case in which the action type is a storage system volume allocation configuration change (S1601a). The configuration change proposal process is for proposing a configuration change that increases the allocatable capacity of the user-selected requirement by releasing the allocation of unused volumes inside the system. The configuration change proposal process will be explained in detail further below.

By contrast, in a case where the action type is HDD addition (S1601b), an HDD addition proposal process is executed (S1603). The HDD addition proposal process is for proposing a configuration for augmenting HDDs so as to satisfy the user-selected volume allocation policy. The HDD addition proposal process will be described in detail further below.

Figure 21:
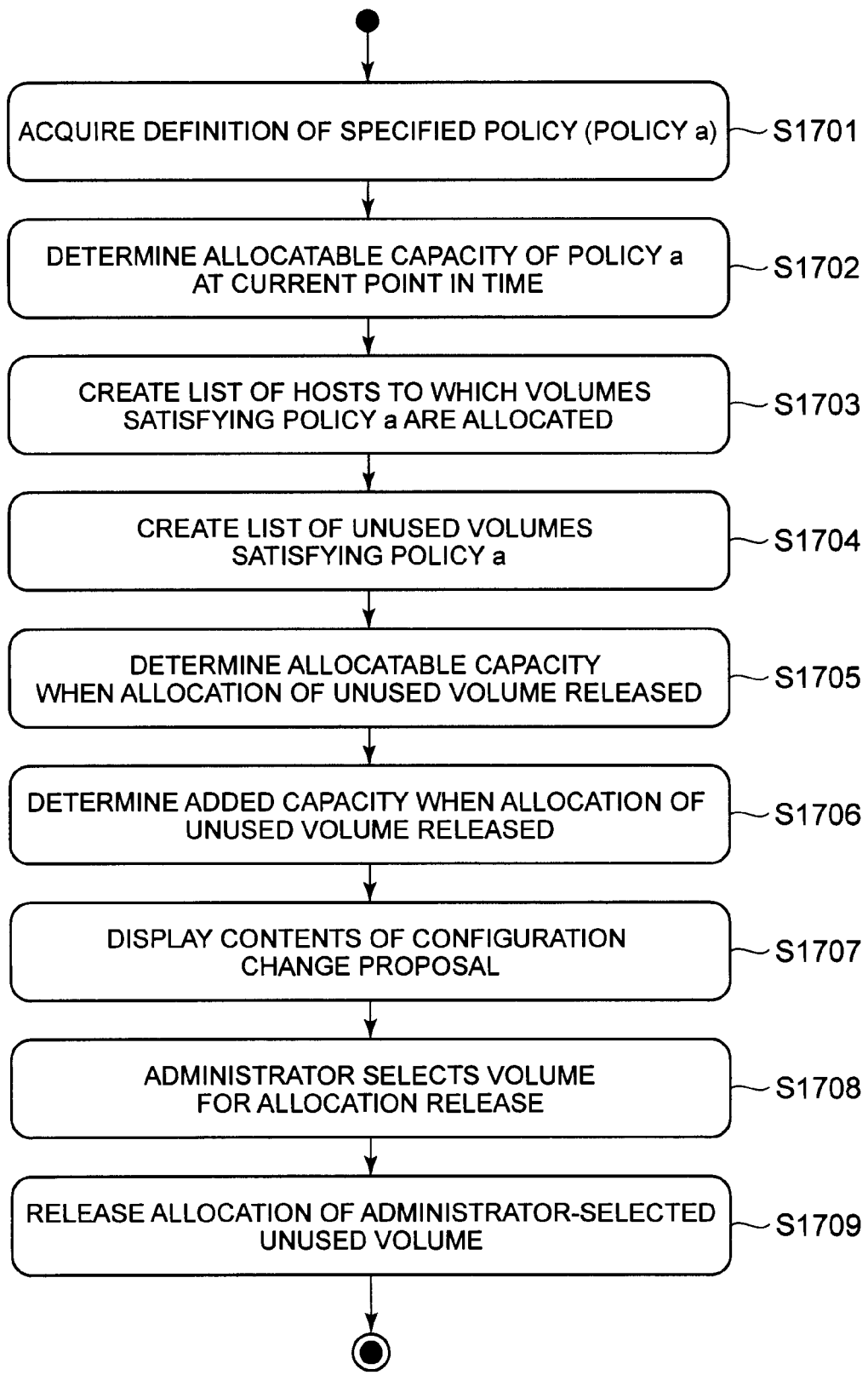
FIG. 21 is a diagram showing an example of a flowchart of a process in this embodiment for increasing the volume allocation capacity by releasing the allocation of an unused volume.
Figure 22:
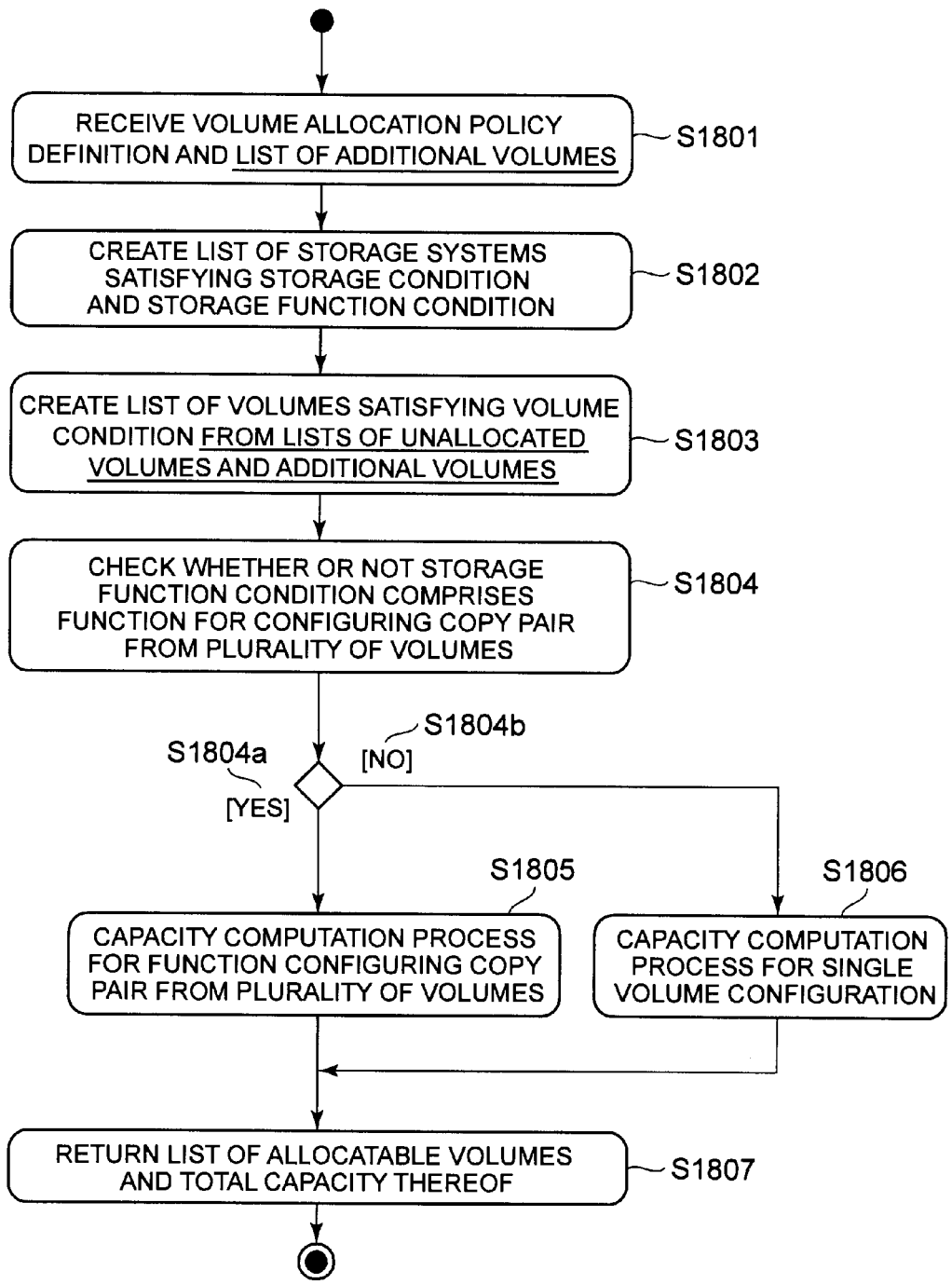
FIG. 22 shows an example of a flowchart of a process in this embodiment for computing an allocatable capacity.

FIGS. 21 and 22 show examples of proposal processes in this embodiment for reserving free capacity in accordance with the administrator changing the volume allocation configuration of the storage system in a case where allocatable capacity has decreased.

FIG. 21 is a diagram showing an example of a process in this embodiment for increasing the volume allocation capacity by releasing the allocation of unused volumes from among the volumes that have already been allocated to the host device 30.

The capacity expansion proposal program 2015 references the policy management information 24 and acquires the definition of the volume allocation policy (policy "a") specified as the capacity expansion target (S1701).

The capacity expansion proposal program 2015 executes the capacity computation program 2013 using the policy "a" as the parameter, and determines the allocatable capacity (capacity "a") of policy "a" at the current point in time (S1702).

The capacity expansion proposal program 2015 creates a list of host devices 30 to which are allocated volumes that satisfy the policy a (S1703).

The policy a, which is the volume allocation policy, will be explained below by using the case of Policy 1 as an example. The capacity expansion proposal program 2015 references the volume management information 21 and the allocation policy management information 24, and selects a storage system 10 that satisfies the storage condition 242 and storage function condition 244 defined in the volume allocation policy. In the case of Policy 1, the capacity expansion proposal program 2015 selects Storage 1. Then, the capacity expansion proposal program 2015 selects the volume(s) that satisfies the volume condition 243 in the selected storage system 10. In the case of Policy 1, volumes 00:01 through 00:05 of Storage 1 and volume 00:01 of Storage 2 are selected. Then, the capacity expansion proposal program 2015 similarly references the allocation destination 217 of the volume management information 21, retrieves the host device(s) 30 to which the selected volumes are allocated, and creates a list (host list "a"). In the case of Policy 1, Host 1, to which are allocated volumes 00:01, 00:02 and 00:04 of Storage 1, is selected and stored in the host list.

The capacity expansion proposal program 2015 creates a list (unused volume list "a") of unused volumes from among the volumes that satisfy the policy "a" (S1704). Specifically, the capacity expansion proposal program 2015 references the host management information 22, references the mount point 224 of the volume for which the policy "a" is set in the allocation policy 225 of the volumes allocated to the respective host devices 30 included in the host list "a", selects the volume for which the mount point is set to n/a, and creates a list. In the case of Policy 1, volume 00:04 of Storage 1 is selected and stored in the unused volume list.

Furthermore, in a case where the unused volume is a PVOL, the PVOL is associated with the SVOL that forms the copy pair and stored in the unused volume list. Further, in a case where the unused volume is an SVOL, the SVOL is associated with the PVOL that forms the copy pair and stored in the unused volume list.

The capacity expansion proposal program 2015 supposes that the allocation of the unused volume to the host has been released (the volume allocation destination is n/a) and executes the capacity computation program, which uses the policy "a" and the unused volume list "a" as the input parameters. Then, in a case where the allocation of the unused volume to the host has been released, determines the allocatable capacity (capacity b) of the policy "a" (S1705).

FIG. 22 shows an example of a flowchart of a process in this embodiment for computing the allocatable capacity. This processing comprises parts that are compatible with the allocatable capacity computation process of FIG. 13. Specifically, the only point that differs is that in the process of FIG. 13, a capacity computation that targets only unallocated volumes as allocatable volume candidates is executed, but in FIG. 23, the unused volume list specified at input time is acquired (S1801). Then, a list of volumes comprising the unused volume list and the unallocated volumes are targeted for capacity computation (S1803). Since all other processing is compatible, the explanation will be omitted.

The capacity expansion proposal program 2015 compares the capacity "a" of prior to releasing the allocation of the unused volume with the capacity "b" of a case in which this allocation was released, and determines a capacity c that increases when the allocation of the unused volume has been released (S1706). That is, capacity "c"=capacity "b"−capacity "a".

Figure 23:
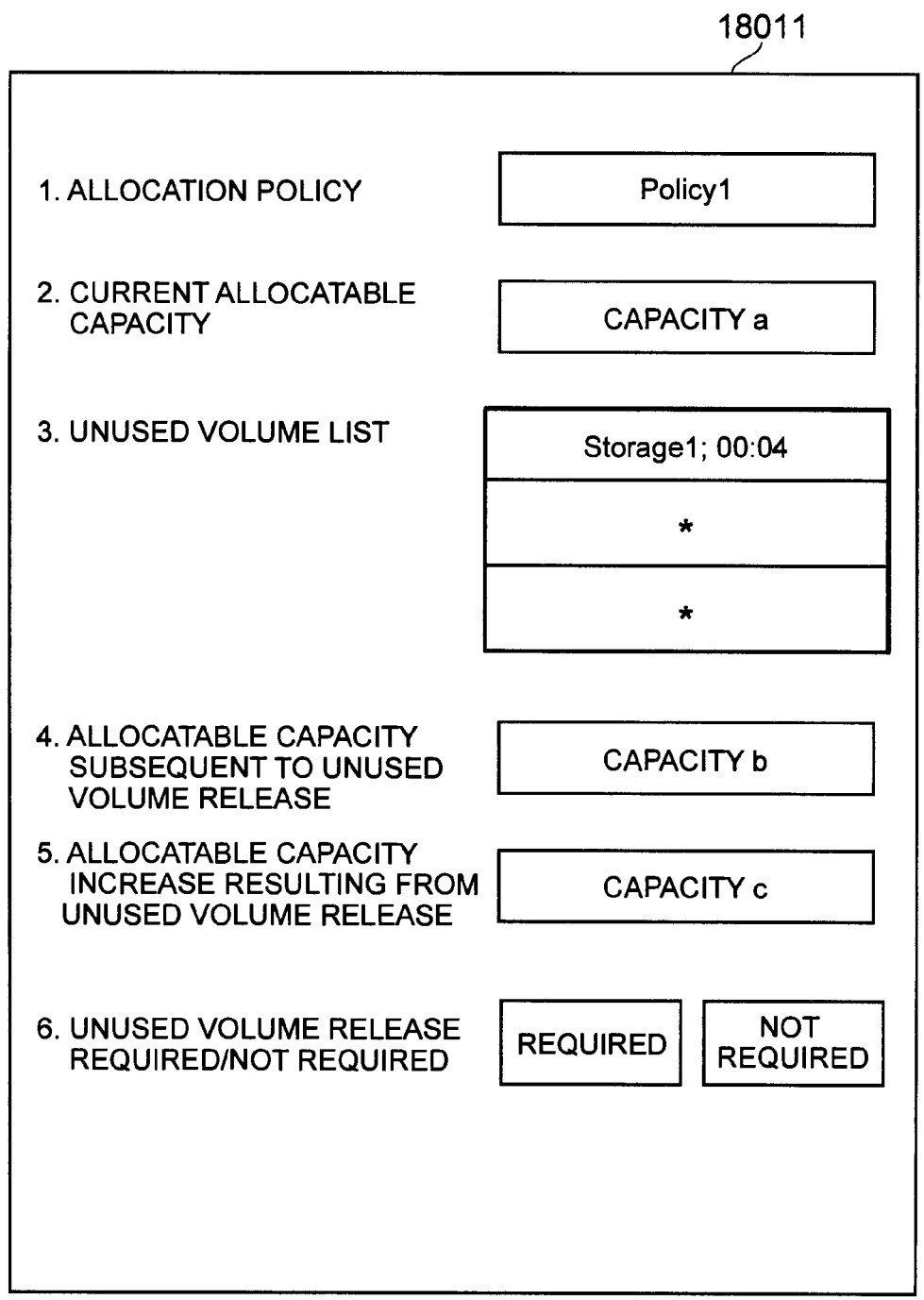
FIG. 23 is a diagram showing an example of a management client device display screen in this embodiment.

Next, the capacity expansion proposal program 2015 displays the unused volume list "b" and the capacity "c", which increased when the unused volume allocation was released, on the management client device 40, and queries the user as to whether or not execution should be carried out (S1707). FIG. 23 is a diagram showing one example of the screen displayed on the management client device 40 in this embodiment.

The administrator selects unused volume release "Required" (Execute) in a case where the release of the allocation of the unused volume displayed in the management client device screen is to be executed, and carries out execution. Further, in a case where the unused volumes allocated to a portion of the hosts are to be released, and the allocation to the other hosts is to be maintained, the administrator selects only the volume(s) for which allocation is to be released, and executes the allocation release (S1708). The allocatable capacity computation process of FIG. 23 may be executed once again at this time using the portion of the volumes and the policy "a" for which the allocation release was specified as the inputs.

In a case where a condition that takes a configuration comprising a plurality of volumes, such as local copy or remote copy, is defined in the storage function condition of the policy "a" at this time, control is exercised so that when the user selects the volume (s) for which allocation is to be released, all related volumes are either selected or selected and released as a single unit. Specifically, in a case where the unused volume is a PVOL, the release of the allocation also includes the SVOL that forms the copy pair. For this reason, for example, in the case of a copy pair, it is not possible to release the allocation of only one side of the copy pair, i.e. the PVOL or the SVOL. This is because enabling the release of the allocation of only one part of the copy pair will result in the volume for which allocation was not released being in violation of the specified policy "a".

When the administrator executes the volume release, a list of the volumes for which allocation release is to be executed is sent to the capacity expansion proposal program 2015, and the capacity expansion proposal program 2015 instructs the volume management program 2011 to release the allocation of the volume (s) included in the acquired unused volume list (S1709).

In accordance with the above processing, it is possible to increase new usable capacity with relation to a specified policy by releasing the allocation of a volume that has been allocated to the host device 30 but is not being used.

Figure 24:
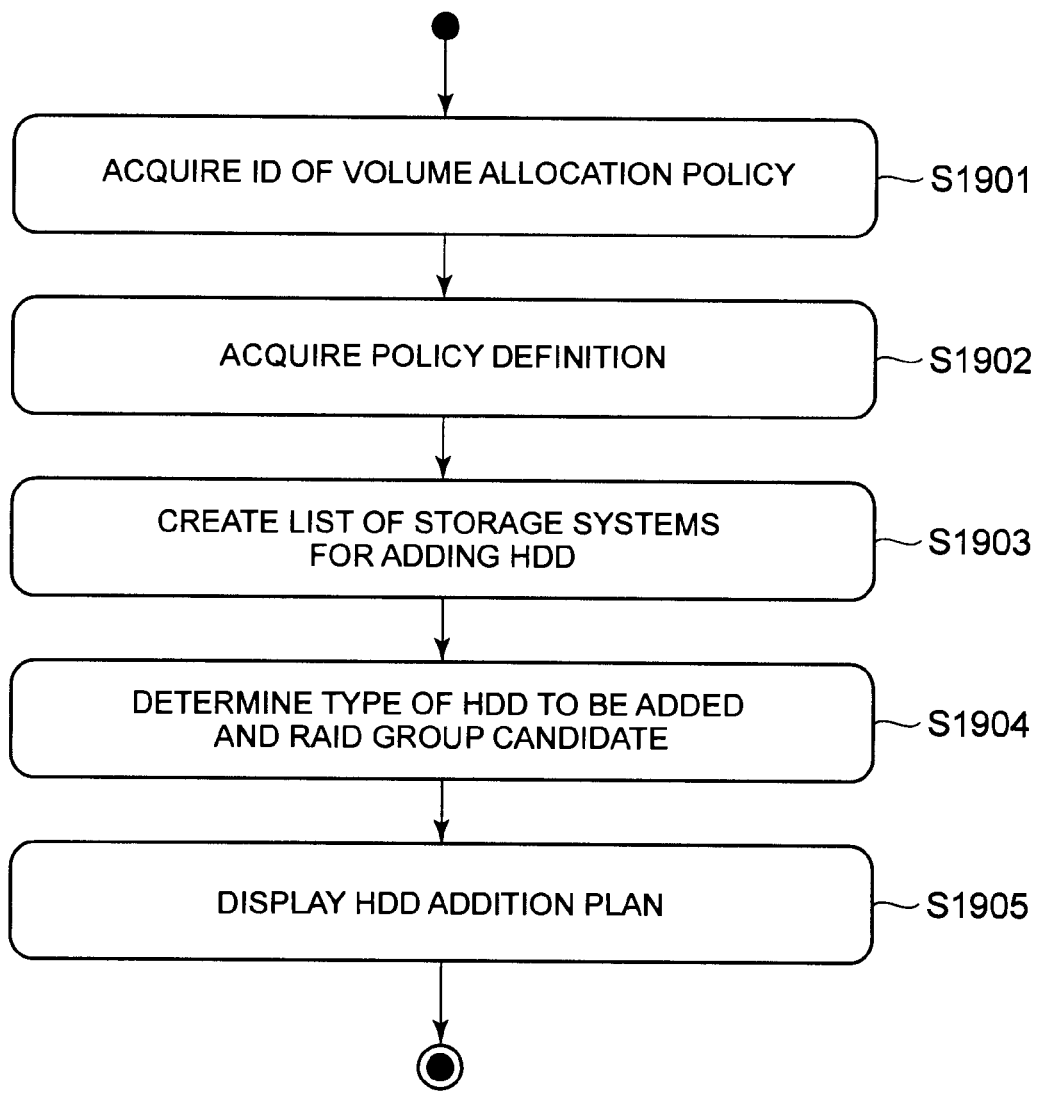
FIG. 24 is a diagram showing an example of a flowchart of a HDD addition proposal process in this embodiment.

FIG. 24 is a diagram showing an example of a flowchart of an HDD addition proposal process in this embodiment.

The capacity expansion proposal program 2015 receives a volume allocation policy ID as a parameter (S1901).

The capacity expansion proposal program 2015 references the policy management information 24, and acquires the storage condition, the volume condition, and the storage function condition included in the policy corresponding to the volume allocation policy ID acquired in S1901 (S1902).

The capacity expansion proposal program 2015 references the storage type of the acquired policy, and creates a list of storage systems that satisfy the storage type (storage list "a") (S1903). The storage systems included on the storage list a will be candidates for HDD augmentation.

The capacity expansion proposal program 2015 references the volume type of the acquired policy, and determines the type of the HDD to be augmented and the RAID level to be set subsequent to HDD addition. In a case where a plurality of volume types are specified, the capacity expansion proposal program 2015 compares the number of policies in which each volume type is specified, and determines the volume type used in the largest number of policies as the candidate (S1904). Adding the HDDs so as to satisfy the volume type used in the largest number of policies makes it possible to efficiently use the unallocated volumes throughout the system to increase the allocatable capacity for another policy. However, in a case where there are a plurality of volume types, all of the respective volume types may be used in the HDD addition proposal, or the volume type may be determined using another algorithm.

When the above processing is complete, the management device 20 notifies the management client device 40 to add the HDDs in the storage systems included in the storage list "a" to satisfy the volume type (s) determined in S1904 (S1905). For example, in the case of Policy 2 of FIG. 10, FC HDDs constituting a RAID5 configuration are displayed for Storages 1, 2 and 3, which correspond to storage type S1.

In accordance with this processing, it is possible to efficiently execute HDD addition related to a volume allocation policy for which the allocatable capacity has become insufficient.

This concludes the explanation of processing for proposing a configuration change method from the management device 20 side. Proposing a configuration change from the management device 20 side makes it possible to do away with the need for the system administrator to individually discern the capacity of each host device 30 and storage system 10 in the information processing system 1, thereby making management less complex.

The preceding has been an explanation of the preferred embodiments of the present invention, but these embodiments are merely examples for explaining the present invention, and do not purport to limit the scope of the present invention to the embodiments. It is possible to put the present invention into practice in a variety of other modes. For example, in the above explanation, the smallest unit of the logical storage area is the LDEV, but the smallest unit of the storage area is not limited to the LDEV.

What is claimed is:

1. A management device managing a plurality of storage systems which include a plurality of storage devices forming a plurality of logical volumes, and are coupled to a host device, the management device comprising:

a memory configured to store allocation policy management information including first allocation policy information denoting a first allocation policy and second allocation policy information denoting a second allocation policy, function management information denoting a function provided to each of the plurality of storage systems, and logical volume management information denoting a capacity of each of the plurality of logical volumes; and a processor configured to execute a process based on the information stored in the memory, wherein the processor is configured to receive an allocation policy, the processor is configured to, based on (a) whether the received allocation policy is the first allocation policy or the second allocation policy, and (b) the allocation policy management information stored in the memory, acquire information showing that a logical volume belonging to a storage system having a first function corresponding to the received allocation policy that constitutes a condition for allocating a logical volume to the host device, the processor is configured to, based on the function management information stored in the memory, retrieve the storage system having the first function from among the plurality of storage systems, and select an unallocated logical volume included in the retrieved storage system, and the processor is configured to, based on (c) whether the received allocation policy is the first allocation policy or the second allocation policy, and (d) the logical volume management information stored in the memory, acquire the logical volume capacity included in the selected logical volume and being different depending on whether the received allocation policy is the first allocation policy or the second allocation policy, and notify an output device of the acquired capacity as a capacity allocatable to the host device, wherein the first function is a function for creating a copy pair in accordance with two or more logical volumes, the processor, when retrieving the storage system, retrieves the storage system having the function for creating the copy pair from among the plurality of storage systems, the processor, when selecting the unallocated logical volume, selects two or more logical volumes for creating the copy pair from among a plurality of first logical volumes, which are included in the retrieved storage system, and which have not been allocated to the host device, the processor acquired the logical volume capacity included in the selected two or more logical volumes, and the processor notifies the output device of the capacity of one of the logical volumes of the two or more logical volumes as a first capacity allocatable to the host device, wherein the processor, wherein selecting two or more logical volumes for creating the copy pair from among the plurality of first logical volumes, selects a primary volume and a secondary volume that has a larger capacity than the primary volume, and the processor notifies the output device of the capacity of the primary volume as the first capacity allocatable to the host device, wherein the memory further stores a threshold value of a capacity allocatable to the host device in accordance with the allocation condition, and in a case where the copy pair is a local copy pair, the processor, based on the function management information stored in the memory, retrieves a storage system having the function for creating the local copy pair from among the plurality of storage systems, and selects two or more logical volumes, which are included in any one storage system included in the retrieved storage systems, and which are to become either the primary volume or a plurality of secondary volume candidates, in a case where the copy pair is a remote copy pair, the processor, based on the function management information stored in the memory, retrieves two or more storage systems having the function for creating the remote copy pair from among the plurality of storage systems, selects as the primary volume a logical volume included in any one storage system among the two or more storage systems, and selects as the plurality of secondary volume candidates a plurality of logical volumes included a storage system that differs from the storage system having the primary volume among the two or more storage systems, the processor, based on the logical volume management information stored in the memory, selects as the secondary volume a volume that most closely approximates the capacity of the primary volume from among a plurality of secondary volume candidates, the processor, based on the logical volume management information stored in the memory, compares the primary volume capacity with the secondary volume capacity, notifies the output device of the smaller of the primary volume capacity and the secondary volume capacity to as the first capacity allocatable to the host device, and does not notify the output device of the larger of the capacities, the processor, based on the threshold value stored in the memory, issues a warning to the output device in a case where the first capacity allocatable to the host device is smaller than the threshold value;

the processor, based on the logical volume management information stored in the memory, selects a first secondary volume, and a second secondary volume after selecting the first secondary volume;

wherein the plurality of storage devices included in the plurality of storage systems form a plurality of RAID groups, and the second secondary volume belongs to a RAID group that differs from a RAID group of the primary volume or the first secondary volume.

2. The management device according to claim 1, wherein the processor compares the capacity of the primary volume with the capacity of the secondary volume, and notifies the output device of the smaller of the capacity of the primary volume and the capacity of the secondary volume as the first capacity allocatable to the host service.

3. The management device according to claim 2, wherein the processor, based on the logical volume management information stored in the memory, selects as the secondary volume a volume that most closely approximates the capacity of the primary volume from among a plurality of secondary volume candidates.

4. The management device according to claim 1, wherein the processor, based on the logical volume management information stored in the memory, selects as the secondary volume a volume that most closely approximates the capacity of the primary volume from among a plurality of secondary volume candidates.

5. The management device according to claim 1, wherein, in a case where the copy pair is a local copy pair, the processor, based on the function management information stored in the memory, retrieves a storage system having the function for creating the local copy pair from among the plurality of storage systems, and selects the two or more logical volumes, which are included in any one of the storage systems included in the retrieved storage systems, and which are to become either the primary volume or the secondary volume.

6. The management device according to claim 5, wherein the plurality of storage devices included in the plurality of storage systems form a plurality of RAID groups, and
the primary volume included in the any one of the storage systems belongs to a first RAID group, and the secondary volume belongs to a second RAID group that differs from the first RAID group.

7. The management device according to claim 1, wherein, in a case where the copy pair is a remote copy pair, the processor, based on the function management information stored in the memory, retrieves two or more storage systems having the function for creating the remote copy pair from among the plurality of storage systems, selects as the primary volume a logical volume included in any one storage system among the two or more storage systems, and selects as the secondary volume a logical volume included in a storage system that differs from the storage system having the primary volume among the two or more storage systems.

8. The management device according to claim 1, wherein the memory stores a threshold value of the capacity allocatable to the host device in accordance with the allocation condition, and
the processor, based on the threshold value stored in the memory, issues a warning to the output device in a case where the first capacity allocatable to the host device is smaller than the threshold value.

9. The management device according to claim 1, wherein the processor retrieves a second logical volume, which is included in the retrieved storage system and is allocated to the host device, but is not mounted by the host device, selects two or more logical volumes for creating a copy pair from among a plurality of first logical volumes and a plurality of second logical volumes, and based on the logical volume management information stored in the memory, acquires the logical volume capacity included in the selected two or more logical volumes, and notifies the output device of the capacity of one logical volume from among the two or more logical volumes as the second capacity allocatable to the host device.

10. The management device according to claim 9, wherein processor notifies the output device of a third allocatable capacity obtained by subtracting the first allocatable capacity from the second allocatable capacity, in addition to the first allocatable capacity and the second allocatable capacity.

11. The management device according to claim 1, wherein the allocation policy management information includes information denoting an application destination host for each of the first and second allocation policies.

12. A management device, which includes a plurality of storage devices forming a plurality of logical volumes, and which manages a plurality of storage systems connected to a host device,
the management device comprising:
a memory configured to store allocation policy management information including first allocation policy information denoting a first allocation policy and second allocation policy information denoting a second allocation policy, function management information denoting a function provided to each of the plurality of storage systems, and logical volume management information denoting a capacity of each of the plurality of logical volumes; and
processor configured to execute a process based on the information stored in the memory, wherein
the processor is configured to receive an allocation policy,
the processor is configured to, based on (a) whether the received allocation policy is the first allocation policy or the second allocation policy, and (b) the allocation policy management information stored in the memory, acquire information showing that a logical volume belonging to a storage system having a first function corresponding to the received allocation policy that constitutes a condition for allocating a logical volume to the host device,
the processor in configured to, based on the function management information stored in the memory, retrieve the storage system having the first function from among the plurality of storage systems, and select an unallocated logical volume included in the retrieved storage system, and
the processor is configured to, based on (c) whether the received allocation policy is the first allocation policy or the second allocation policy, and (d) the logical volume management information stored in the memory, acquire the logical volume capacity included in the selected logical volume and being different depending on whether the received allocation policy is the first allocation policy or the second allocation policy, and notify an output device of the acquired capacity as a capacity allocatable to the host device,
wherein
the first function is a function for creating a copy pair in accordance with two or more logical volumes,
the processor, when retrieving the storage system, retrieves the storage system having the function for creating the copy pair from among the plurality of storage systems,
the processor, when selecting the unallocated logical volume, selects two or more logical volumes for creating the copy pair from among a plurality of first logical volumes, which are included in the retrieved storage system, and which have not been allocated to the host device,
the processor acquires the logical volume capacity included in the selected two or more logical volumes, and
the processor notifies the output device of the capacity of one of the logical volumes of the two or more logical volumes as a first capacity allocatable to the host device,
wherein the memory further stores a threshold value of a capacity allocatable to the host device in accordance with the allocation condition, and
in a case where the copy pair is a local copy pair, the processor, based on the function management information stored in the memory, retrieves a storage system having the function for creating the local copy pair from among the plurality of storage systems, and selects two or more logical volumes, which are included in any one storage system included in the retrieved storage systems, and which are to become either the primary volume or a plurality of secondary volumes candidates, in a case where the copy pair is a remote copy pair, the processor, based on the function management information stored in the memory, retrieves two or more storage systems having the function for creating the remote copy pair from among the plurality of storage systems, selects as the primary volume a logical volume included in any one storage system among the two or more storage systems, and selects as the plurality of secondary volume candidates a plurality of logical volumes included a storage system that differs from the storage system having the primary volume among the two or more storage systems, the processor, based on the logical volume management information stored in the memory, selects as the secondary volume a volume that most closely approximates the capacity of the primary volume from among a plurality of secondary volume candidates, the processor, based on the logical volume management information stored in the memory, select as the secondary volume a volume that most closely approximates the capacity of the primary volume from among a plurality of secondary volume candidates, the processor, based on the logical volume management information stored in the memory, compares the primary volume capacity with the secondary volume capacity, notifies the output device of the smaller of the primary volume capacity and the secondary volume capacity to as the first capacity allocatable to the host device, and does not notify the output device of the larger of the capacities, the processor, based on the threshold value stored in the memory, issues a warning to the output device in a case where the first capacity allocatable to the host device is smaller than the threshold value, and the processor, subsequent to issuing the warning, retrieves a second logical volume, which is included in the retrieved storage system and is allocated to the host device, but is not mounted by the host device, selects two or more logical volumes for creating a copy pair from among a plurality of first logical volumes and a plurality of second logical volumes, and based on the logical volume management information stored in the memory, acquires the logical volume capacity included in the selected two or more logical volume and notifies the output device of the capacity of one logical volume from among the two or more logical volumes to as the second capacity allocatable to the host device.

13. A management method for managing a plurality of storage systems, which are coupled to a host device, and which include a plurality of storage devices forming a plurality of logical volumes, the management method, comprising the steps of:

storing, in a memory, allocation policy management information that includes first allocation policy information that denotes a first allocation policy and second allocation policy information that denotes a second allocation policy;

receiving by a processor an allocation policy;

acquiring by the processor, based on whether the received allocation policy is the first allocation policy or the second allocation policy, and based on the allocation policy management information stored in the memory, information showing that a logical volume belonging to a storage system having a first function corresponding to the received allocation policy constitutes a condition for allocating a logical volume to the host device;

retrieving the storage system having the first function from among the plurality of storage systems;

acquiring, based on whether the received allocation policy is the first allocation policy or the second allocation policy, and based on the logical volume management information stored in the memory, the logical volume capacity included in the selected volume and being different depending on whether the received allocation policy is the first allocation policy or the second allocation policy;

notifying an output device of the selected logical volume as a first capacity allocatable to the host device;

displaying the notified first allocatable capacity of the output device, wherein the first function is a function for creating a copy pair in accordance with two or more logical volumes;

when retrieving the storage system, retrieving the storage system having the function for creating the copy pair from among the plurality of storage systems;

when selecting the unallocated logical volume, selecting two or more logical volumes for creating the copy pair from among a plurality of first logical volumes, which are included in the retrieved storage system, and which have not been allocated to the host device;

acquiring the logical volume capacity included in the selected two or more logical volumes, notifying the output device of the capacity of one of the logical volumes of the two or more logical volumes as a first capacity allocatable to the host device, wherein selecting two or more logical volumes for creating the copy pair from among the plurality of first logical volumes, selecting a primary volume and a secondary volume that has a larger capacity than the primary volume, and notifying the output device of the capacity of the primary volume as the first capacity allocated to the host device, wherein the memory further stores a threshold value of a capacity allocatable to the host device in accordance with the allocation condition, in a case where the copy pair is a local copy pair, based on the function management information stored in the memory, retrieving a storage system having the function for creating the local copy pair from among the plurality of storage systems, and selecting two or more logical volumes, which are included in any one storage system included in the retrieved storage systems, and which are to become either the primary volume or a plurality of secondary volume candidates, in a case where the copy pair is a remote copy pair, based on the function management information stored in the memory, retrieving two or more storage systems having the function for creating the remote copy pair from among the plurality of storage systems, selecting as the primary volume a logical volume included in any one storage system among the two or more storages systems, and selecting as the plurality of secondary volume candidates a plurality of logical volumes included a storage system that differs from the storage system having the primary volume among the two or more storage systems, based on the logical volume management information stored in the memory, selecting as the secondary volume a volume that most closely approximates the capacity of the primary volume from among a plurality of secondary volume candidates, based on the logical volume management information stored in the memory, comparing the primary volume capacity with the secondary volume capacity, notifying the output device of the smaller of the primary volume capacity and the secondary volume capacity to as the first capacity allocatable to the host device, and not notifying the output device of the larger of the capacities, and based on the threshold value stored in the memory, issuing a warning to the output device in a case where the first capacity allocatable to the host device is smaller than the threshold value;

based on the logical volume management information stored in the memory, selecting a first secondary volume, and a second secondary volume after selecting the first secondary volume;

wherein the plurality of storage devices included in the plurality of storage systems form a plurality of RAID groups, and the second secondary volume belongs to a RAID group that differs from a RAID group of the primary volume or the first secondary volume.

14. The management method according to claim 13, further comprising the steps of:

comparing the primary volume capacity with the secondary volume capacity, and notifying the output device of the smaller of these capacities as the first capacity allocatable to the host device.

15. The management method according to claim 13, wherein the allocation policy management information includes information denoting an application destination host for each of the first and second allocation policies.

* * * * *